United States Patent
Wang et al.

(10) Patent No.: US 10,756,800 B2
(45) Date of Patent: Aug. 25, 2020

(54) CSI-RS CONFIGURATION AND CSI FEEDBACK METHOD AND APPARATUS, BASE STATION AND USER EQUIPMENT

(71) Applicant: CHINA MOBILE COMMUNICATIONS GROUP CO., LTD, Beijing (CN)

(72) Inventors: Fei Wang, Beijing (CN); Jianjun Liu, Beijing (CN); Hui Tong, Beijing (CN); Qixing Wang, Beijing (CN)

(73) Assignee: China Mobile Communications Group Co., Ltd., Beijing (CN)

( * ) Notice: Subject to any disclaimer, the term of this patent is extended or adjusted under 35 U.S.C. 154(b) by 35 days.

(21) Appl. No.: 16/097,851

(22) PCT Filed: May 16, 2016

(86) PCT No.: PCT/CN2016/082174
§ 371 (c)(1),
(2) Date: Oct. 31, 2018

(87) PCT Pub. No.: WO2017/197552
PCT Pub. Date: Nov. 23, 2017

(65) Prior Publication Data
US 2019/0149212 A1    May 16, 2019

(51) Int. Cl.
*H04B 7/06* (2006.01)
*H04L 5/00* (2006.01)
(Continued)

(52) U.S. Cl.
CPC .......... *H04B 7/0626* (2013.01); *H04L 5/005* (2013.01); *H04L 5/0048* (2013.01);
(Continued)

(58) Field of Classification Search
CPC ... H04B 7/0417; H04B 7/0626; H04L 5/0048; H04L 5/005; H04L 5/0094; H04W 24/10;
(Continued)

(56) References Cited

U.S. PATENT DOCUMENTS

| 10,425,141 B2* | 9/2019 | Noh ........................ H04B 7/04 |
| 2016/0094326 A1* | 3/2016 | Moon .................. H04L 5/0026 |
| | | 370/330 |

FOREIGN PATENT DOCUMENTS

| CN | 102111879 A | 6/2011 |
| CN | 102237951 A | 11/2011 |

(Continued)

OTHER PUBLICATIONS

International Search Report and Written Opinion issued in PCT/CN2016/082174, dated Jan. 26, 2017.

(Continued)

Primary Examiner — Luat Phung
Assistant Examiner — Thomas R Cairns
(74) Attorney, Agent, or Firm — BakerHostetler

(57) ABSTRACT

Disclosed are a CSI-RS configuration and CSI feedback method and apparatus, and a relevant device, which are used for implementing 16-port CSI-RS configuration and performing CSI feedback based on a 16-port CSI-RS. The CSI-RS configuration method comprises: determining 16-port channel state information-reference signal (CSI-RS) configuration information configured to a user equipment (UE), wherein the CSI-RS configuration information comprises information about a resource element (RE) occupied by a 16-port CSI-RS configured to the UE, and the RE occupied by the 16-port CSI-RS comprises an RE other than REs occupied by a physical downlink control channel (PDCCH), a cell-dedicated reference signal (RS) and a UE- (Continued)

dedicated RS; and sending, to the UE, the 16-port CSI-RS configuration information configured to the UE.

3 Claims, 26 Drawing Sheets

(51) Int. Cl.
*H04W 24/10* (2009.01)
*H04W 72/04* (2009.01)
*H04B 7/0417* (2017.01)

(52) U.S. Cl.
CPC .......... *H04L 5/0094* (2013.01); *H04W 24/10* (2013.01); *H04W 72/042* (2013.01); *H04W 72/0446* (2013.01); *H04W 72/0453* (2013.01); *H04B 7/0417* (2013.01)

(58) Field of Classification Search
CPC .......... H04W 72/042; H04W 72/0446; H04W 72/0453
See application file for complete search history.

(56) References Cited

FOREIGN PATENT DOCUMENTS

| CN | 102340801 A | 2/2012 |
|---|---|---|
| CN | 102378114 A | 3/2012 |
| CN | 103347298 A | 10/2013 |
| CN | 105471552 A | 4/2016 |
| WO | 2014051374 A1 | 4/2014 |
| WO | 2014110837 A1 | 7/2014 |
| WO | 2015190847 A1 | 12/2015 |

OTHER PUBLICATIONS

"High-Level Design Principles for CSI-RS Enhancements" CATT, 3GPP TSG RAN WG1 Meeting #82, Beijing, P.R. China, Aug. 24-28, 2015, R1-153932, Agenda Item: 7.2.5.2.1, 4 Pages.
"CSI-RS design for 12 and 16 ports" Huawei, HiSilicon, 3GPP TSG RAN WG1 Meeting #82, Beijing, China, Aug. 24-28, 2015, R1-153792, Agenda Item: 7.2.5.2.1, 5 Pages.
"Details on non-precoded CSI-RS designs", LG Electronics, 3GPP TSG RAN WG1 Meeting #82bis, Agenda item: 7.2.4.2. 1, R1-155396, Malmo, Sweden, Oct. 5-9, 2015, downloaded by EPO on Oct. 4, 2015, XP051002303, 8 Pages.
"NZP CSI-RS configuration and RE mapping for class A CSI reporting", Samsung, 3GPP TSG RAN WG1 Meeting #82bis, Agenda item: 7 .2.4.2.1; R1-155483, Malmo, Sweden, Oct. 5-9, 2015, XP051039661, 8 Pages.
"3rd Generation Partnership Project;Technical Specification Group Radio Access Network; Evolved Universal Terrestrial Radio Access (E-UTRA);Physical channels and modulation" 3GPP TS 36.211, V13.1.0, Technical Specification, Release 13, Mar. 2016, XP051088459, 156 Pages.
Extended Search Report issued in European Application No. 16901938.7, dated Nov. 26, 2019.
"3rd Generation Partnership Project;Technical Specification Group Radio Access Network; Evolved Universal Terrestrial Radio Access (E-UTRA); Physical channels and modulation" 3GPP TS 36.211, V11.7.0, Technical Specification, Release 11, Mar. 2017, 120 Pages.

\* cited by examiner

CSI-RS CONFIGURATION AND CSI FEEDBACK METHOD AND APPARATUS, BASE STATION AND USER EQUIPMENT

CROSS-REFERENCE TO RELATED APPLICATIONS

The present application is a National Stage of International Patent Application No. PCT/CN2016/082174, filed May 16, 2016, the contents of which is hereby incorporated by reference in its entirety.

TECHNICAL FIELD

The present disclosure relates to the technical field of wireless communications, and particularly to methods and devices for configuring a Channel State Information-Reference Signal (CSI-RS) and for feeding back Channel State Information (CSI) and related equipment.

BACKGROUND

In a Long Term Evolution-Advanced (LTE-Advanced) system, a CSI-RS is defined. The CSI-RS is a downlink pilot signal, and is an existing signal provided by a sender to a receiver and configured for useful signal channel measurement. CSI feedback may be divided into a periodic feedback mode and a nonperiodic feedback mode. The CSI is formed by a Rank Indicator (RI), a Precoding Matrix Indicator (PMI) and a Channel Quality Indicator (CQI). For nonperiodic CSI feedback, a system working flow is as follows.

1. A base station triggers CSI-RS measurement performed by a user on a certain downlink subframe, and sends a CSI-RS.
2. A terminal obtains a triggering message, measures the CSI-RS on the corresponding subframe, and estimates useful signal quality.
3. The terminal determines CSI according to the useful signal quality.
4. The terminal delays for at least K subframes, and feeds back the CSI on an available uplink subframe (where K refers to a processing time for CSI calculation of the terminal).
5: The base station receives the CSI fed back by the terminal on the corresponding uplink subframe.

A three Dimensions Multiple-Input Multiple-Out-put (3D-MIMO) technology is a topic under discussion of the 3rd Generation Partnership Project Radio Access Network 1 (3GPP RAN1), and 3D-MIMO mainly adopts a two-dimensional array antenna, and may be described with the following parameters (M, N, P, Q), where M represents a number of elements of a column of polarized antennae, N represents a column number of an antenna array, P=2 represents adoption of dual-polarized antennae, $M_{TXRU}$ represents a number of transceiver channels corresponding to the same column of antennae, a transceiver channel may correspond to a plurality of antenna elements, and Q=2N*$M_{TXRU}$ represents a total number of Transceiver Units (TXRUs) included in a TXRU array corresponding to the antenna array. For example, an antenna array corresponding to (M, N, P, $M_{TXRU}$)=(8,4,2,4) may be represented by FIG. 1 (left), and a TXRU array corresponding to Q=32 may be represented by FIG. 1 (right), TXRU # ($m_{TXRU}$, $n_{TXRU}$) representing a certain TXRU.

CSI feedback enhancement is an important topic in 3D-MIMO, and at present, three main solutions are adopted.

A first solution: Full port CSI-RS (all CSI-RS ports)-based CSI feedback, where, in the solution, a number of CSI-RS ports is equal to a number of TXRUs, and they are in a one-to-one mapping relationship, as shown in FIG. 2.

A second solution: Partial port CSI-RS (part of CSI-RS ports)-based CSI feedback, where the solution adopts two sets of independent CSI-RSs, where 2N ports are involved in one set of CSI-RSs, and are mapped to 2N TXRUs in a certain row of a TXRU array one to one, and $M_{TXRU}$ ports are involved in the other set of CSI-RSs, and are mapped to $M_{TXRU}$ TXRUs in a certain column of the TXRU array one to one, as shown in FIG. 3.

A third solution: Beamformed CSI-RS (beamformed CSI-RSs)-based CSI feedback, where, in the solution, the CSI-RSs are beamformed in a vertical dimension, $M_{TXRU}$ TXRUs in the same column are mapped onto B vertical-dimension beams through B groups of different vertical-dimension forming weights, and each vertical-dimension beam corresponds to a set of CSI-RSs (2N ports are involved in each set), so that there are totally B sets of CSI-RSs, as shown in FIG. 4.

The first solution is a method adopted by a current LTE system, and its advantage is that User Equipment (UE) may estimate most comprehensive channel information, that is, the UE may obtain channel information between the UE and all sending antenna ports. However, when the solution is adopted, if a number of ports is relatively large, on one hand, CSI-RS overhead is high, and it is overhead corresponding to different CSI-RS ports. In present LTE, overhead of 8 CSI-RS ports is about 1.5%, overhead of 16 CSI-RS ports is 3%, and overhead of 32 CSI-RS ports and 64 ports is relatively high.

It is widely believed in the industry that: CSI-RS overhead is acceptable when a number of ports is relatively small (for example, smaller than 20), so that the first solution may be adopted; and when the number of the ports is relatively large (for example, larger than 20), CSI-RS overhead of Full port CSI-RS-based CSI feedback is too high, so that the second solution and the third solution are required to be considered.

A system in a related technology supports 1, 2, 4 and 8 CSI-RS ports. CSI-RS pattern designs in FIG. 5a-FIG. 5c may be applied to a frame structure type 1 (Frequency Division Duplex (FDD)) and a frame structure type 2 (Time Division Duplex (TDD)), a Resource Element (RE) configured for CSI-RSs is represented by two letters, the first letter represents a cell index, and the second letter represents antenna ports transmitted on the RE. These patterns adopt a nested structure, that is, 2-port CSI-RS antenna ports are subsets of 4-port and 8-port CSI-RS antenna ports, and such a design is favorable for reducing complexity in implementation. There are totally 40 antenna ports, and it is supported that an intercell frequency multiplexing factor is 5 and each cell adopts 8 CSI-RS antenna ports or the intercell frequency multiplexing factor is 20 and each cell adopts 2 CSI-RS antenna ports. From FIG. 5a-FIG. 5c, it can be seen that a Demodulation Reference Signal (DMRS) (Port 5 is configured to send the DMRS) configured for a Transmission Mode 7 (TM7) in Release 8 (R8) may collide with a CSI-RS, so that it is necessary to avoid scheduling a user of the TM7 in a subframe where the CSI-RS is sent. CSI-RS pattern designs in FIG. 5d-FIG. 5f are only applied to the frame structure type 2 (TDD), mainly for avoiding the DMRS (Port 5) configured for the TM7 in R8 to collide with the CSI-RS. A CSI-RS design in the system of the related technology adopts an orthogonal code division design with a length of 2 in a time domain, so that CSI-RSs of two antenna ports share 2 REs on the same subcarrier.

Configuration of a CSI-RS of up to 8 ports is supported only in the related technology, and how to implement configuration of a 16-port CSI-RS and perform CSI feedback on the basis of the 16-port CSI-RS becomes one of technical problems urgent to be solved.

SUMMARY

Embodiments of the disclosure provide methods and devices for configuring a CSI-RS and for feeding back CSI and related equipment, which are adopted to implement configuration of a 16-port CSI-RS and perform CSI feedback on the basis of the 16-port CSI-RS.

The embodiments of the disclosure provide a method for configuring a CSI-RS. The method may include the following actions.

Configuration information of a 16-port CSI-RS configured for UE is determined. The configuration information of the CSI-RS includes information of REs occupied by the 16-port CSI-RS configured for the UE. The REs occupied by the 16-port CSI-RS includes REs other than REs occupied by a Physical Downlink Control Channel (PDCCH), a cell-specific Reference Signal (RS) and a UE-specific RS.

The configuration information of the 16-port CSI-RS configured for the UE is sent to the UE.

According to an embodiment, the REs occupied by the CSI-RS may be predetermined REs occupied by a CSI-RS; and the REs occupied by the 16-port CSI-RS configured for the UE may be any 16 REs selected from the predetermined REs occupied by the CSI-RS.

The REs occupied by the 16-port CSI-RS may be:

REs corresponding to (k,l)={(8,5),(8,6),(9,5),(9,6)} of a first slot and REs corresponding to (k,l)={(10,2),(10,3),(11,2),(11,3),(6,2)(6,3),(7,2)(7,3),(8,5),(8,6)(9,5),(9,6)} of a second slot in each of Physical Resource Blocks (PRBs); or REs corresponding to (k,l)={(2,5),(2,6),(3,5),(3,6)} of the first slot and REs corresponding to (k,l)={(4,2),(4,3),(5,2),(5,3),(1,2)(1,3),(0,2)(0,3),(2,5),(2,6)(3,5),(3,6)} of the second slot in each of the PRBs, where k may be a subcarrier sequence number of a subcarrier included in the PRB and k may be sequentially valued to be 0, 1, 2, . . . , 11 from bottom to top; and l may be an Orthogonal Frequency Division Multiplexing (OFDM) sequence number included in each of slots in the PRB and l may be sequentially valued to be 0, 1, 2, . . . , 6 from left to right in the slot.

According to an embodiment, the REs occupied by the CSI-RS may be predetermined REs occupied by a CSI-RS; and the REs occupied by the 16 CSI-RS configured for the UE may be a combination of REs occupied by any two 8-port CSI-RSs.

According to an embodiment, the REs occupied by the 16-port CSI-RS may be:

REs corresponding to (k,l)={(8,5),(8,6),(9,5),(9,6),(2,5),(2,6),(3,5),(3,6)} of the first slot and REs corresponding to (k,l)={(10,2),(10,3),(11,2),(11,3),(4,2)(4,3),(5,2)(5,3)} of the second slot in each of PRBs; or REs corresponding to (k,l)={(7,2),(7,3),(6,2),(6,3),(0,2)(0,3),(1,2)(1,3),(9,5),(9,6),(8,5),(8,6),(3,5),(3,6),(2,5),(2,6)} of the second slot in each of the PRBs, where k may be a subcarrier sequence number of a subcarrier included in the PRB and k may be sequentially valued to be 0, 1, 2, . . . , 11 from bottom to top; and l may be an OFDM sequence number included in each of slots in the PRB and l may be sequentially valued to be 0, 1, 2, . . . , 6 from left to right in the slot.

According to an embodiment, the REs occupied by the 16-port CSI-RS may be:

REs corresponding to (k,l)={(8,5),(8,6),(9,5),(9,6),(2,5),(2,6),(3,5),(3,6)} of the first slot and REs corresponding to (k,l)={(6,2),(6,3),(7,2),(7,3),(1,2)(1,3),(0,2)(0,3)} of the second slot in each of PRBs; or REs corresponding to (k,l)={(11,2),(11,3),(10,2),(10,3),(5,2)(5,3),(4,2)(4,3),(9,5),(9,6),(8,5),(8,6),(3,5),(3,6),(2,5),(2,6)} of the second slot in each of the PRBs, where k may be a subcarrier sequence number of a subcarrier included in the PRB and k may be sequentially valued to be 0, 1, 2, . . . , 11 from bottom to top; and l may be an OFDM sequence number included in each of slots in the PRB and l may be sequentially valued to be 0, 1, 2, . . . , 6 from left to right in the slot.

According to an embodiment, the information of the REs occupied by the 16-port CSI-RS configured for the UE may be determined according to the following actions.

The information of the REs occupied by the 16-port CSI-RS is determined to be (p,q), where p may be CSI reference configuration information corresponding to the REs occupied by the first 8-port CSI-RS in the REs occupied by the 16-port CSI-RS, and p=0, 1, 2, 3, 4; and q may be CSI reference configuration information corresponding to the REs occupied by the second 8-port CSI-RS in the REs occupied by the 16-port CSI-RS, and q=0, 1, 2, 3, 4.

According to an embodiment, the REs occupied by the CSI-RS may include predetermined REs occupied by a CSI-RS and 8 newly added REs.

According to an embodiment, the newly added REs may include REs corresponding to (k,l)={(4,5),(4,6),(7,5),(7,6)} of the first slot and REs corresponding to (k,l)={(4,5),(4,6),(7,5),(7,6)} of the second slot in each of PRBs, where k may be a subcarrier sequence number of a subcarrier included in the PRB and k may be sequentially valued to be 0, 1, 2, . . . , 11 from bottom to top; and l may be an OFDM sequence number included in each of slots in the PRB and l may be sequentially valued to be 0, 1, 2, . . . , 6 from left to right in the slot.

According to an embodiment, the REs occupied by the 16-port CSI-RS configured for the UE may be any 16 REs selected from the REs occupied by the CSI-RS and the 8 newly added REs.

According to an embodiment, the REs occupied by the 16-port CSI-RS configured for the UE may be a combination of REs occupied by any two 8-port CSI-RSs or a combination of the REs occupied by an 8-port CSI-RS and the 8 newly added REs.

According to an embodiment, the REs occupied by the 16-port CSI-RS may be:

REs corresponding to (k,l)={(7,5),(7,6),(4,5),(4,6)} of the first slot and REs corresponding to (k,l)={(9,2),(9,3),(8,2),(8,3),(3,2)(3,3),(2,2)(2,3),(7,5),(7,6)(4,5),(4,6)} of the second slot in each PRB.

According to an embodiment, the information of the REs occupied by the 16-port CSI-RS configured for the UE may be determined according to the following actions.

CSI reference configuration information corresponding to the 8 newly added REs is determined to be 5.

The information of the REs occupied by the 16-port CSI-RS is determined to be (p,q), where p may be CSI reference configuration information corresponding to the first 8 REs in the REs occupied by the 16-port CSI-RS, and p=0, 1, 2, 3, 4, 5; and q may be CSI reference configuration information corresponding to the latter REs in the REs occupied by the 16-port CSI-RS, and q=0, 1, 2, 3, 4, 5.

According to an embodiment, the method for configuring CSI-RS may further include the following actions.

CSI feedback information sent by the UE is received, where the CSI feedback information is determined based on a measurement result of CSI-RS measurement performed by the UE according to the configuration information of the CSI-RS.

The embodiments of the disclosure provide a device for configuring a CSI-RS. The device may include: a determination unit and a sending unit.

The determination unit is configured to determine configuration information of a 16-port CSI-RS configured for UE, the configuration information of the CSI-RS including information of REs occupied by the 16-port CSI-RS configured for the UE and the REs occupied by the 16-port CSI-RS including REs other than REs occupied by a PDCCH, a cell-specific RS and a UE-specific RS.

The sending unit is configured to send, to the UE, the configuration information of the 16-port CSI-RS configured for the UE.

According to an embodiment, the REs occupied by the CSI-RS may be predetermined REs occupied by a CSI-RS; and the REs occupied by the 16-port CSI-RS configured for the UE may be any 16 REs selected from the predetermined REs occupied by the CSI-RS.

According to an embodiment, the REs occupied by the 16-port CSI-RS may be:

REs corresponding to (k,l)={(8,5),(8,6),(9,5),(9,6)} of a first slot and REs corresponding to (k,l)={(10,2),(10,3),(11,2),(11,3),(6,2)(6,3),(7,2)(7,3),(8,5),(8,6)(9,5),(9,6)} of a second slot in each of PRBs; or REs corresponding to (k,l)={(2,5),(2,6),(3,5),(3,6)} of the first slot and REs corresponding to (k,l)={(4,2),(4,3),(5,2),(5,3),(1,2)(1,3),(0,2)(0,3),(2,5),(2,6)(3,5),(3,6)} of the second slot of the PRBs, where k may be a subcarrier sequence number of a subcarrier included in the PRB and k may be sequentially valued to be 0, 1, 2, . . . , 11 from bottom to top; and l may be an OFDM sequence number included in each of slots in the PRB and l may be sequentially valued to be 0, 1, 2, . . . , 6 from left to right in the slot.

According to an embodiment, the REs occupied by the CSI-RS may be predetermined REs occupied by a CSI-RS; and the REs occupied by the 16 CSI-RS configured for the UE may be a combination of REs occupied by any two 8-port CSI-RSs.

According to an embodiment, The REs occupied by the 16-port CSI-RS may be:

REs corresponding to (k,l)={(8,5),(8,6),(9,5),(9,6),(2,5),(2,6),(3,5),(3,6)} of the first slot and REs corresponding to (k,l)={(10,2),(10,3),(11,2),(11,3),(4,2)(4,3),(5,2)(5,3)} of the second slot in each of PRBs; or REs corresponding to (k,l)={(7,2),(7,3),(6,2),(6,3),(0,2)(0,3),(1,2)(1,3),(9,5),(9,6),(8,5),(8,6),(3,5),(3,6),(2,5),(2,6)} of the second slot in each of the PRBs, where k may be a subcarrier sequence number of a subcarrier included in the PRB and k may be sequentially valued to be 0, 1, 2, . . . , 11 from bottom to top; and l may be an OFDM sequence number included in each of slots in the PRB and l may be sequentially valued to be 0, 1, 2, . . . , 6 from left to right in the slot.

According to an embodiment, the REs occupied by the 16-port CSI-RS may be:

REs corresponding to (k,l)={(8,5),(8,6),(9,5),(9,6),(2,5),(2,6),(3,5),(3,6)} of the first slot and REs corresponding to (k,l)={(6,2),(6,3),(7,2),(7,3),(1,2)(1,3),(0,2)(0,3)} of the second slot in each of PRBs; or REs corresponding to (k,l)={(11,2),(11,3),(10,2),(10,3),(5,2)(5,3),(4,2)(4,3),(9,5),(9,6),(8,5),(8,6),(3,5),(3,6),(2,5),(2,6)} of the second slot in each of the PRBs, where k may be a subcarrier sequence number of a subcarrier included in the PRB and k may be sequentially valued to be 0, 1, 2, . . . , 11 from bottom to top; and l may be an OFDM sequence number included in each of slots in the PRB and l may be sequentially valued to be 0, 1, 2, . . . , 6 from left to right in the slot.

According to an embodiment, the determination unit may specifically be configured to determine the information of the REs occupied by the 16-port CSI-RS configured for the UE according to the following method: determining the information of the REs occupied by the 16-port CSI-RS to be (p,q), where p may be CSI reference configuration information corresponding to the REs occupied by the first 8-port CSI-RS in the REs occupied by the 16-port CSI-RS, and p=0, 1, 2, 3, 4; and q may be CSI reference configuration information corresponding to the REs occupied by the second 8-port CSI-RS in the REs occupied by the 16-port CSI-RS, and q=0, 1, 2, 3, 4.

According to an embodiment, the REs occupied by the CSI-RS may include predetermined REs occupied by a CSI-RS and 8 newly added REs.

According to an embodiment, the newly added REs may include REs corresponding to (k,l)={(4,5),(4,6),(7,5),(7,6)} of the first slot and REs corresponding to (k,l)={(4,5),(4,6),(7,5),(7,6)} of the second slot in each of PRBs, where k may be a subcarrier sequence number of a subcarrier included in the PRB and k may be sequentially valued to be 0, 1, 2, . . . , 11 from bottom to top; and l may be an OFDM sequence number included in each of slots in the PRB and l may be sequentially valued to be 0, 1, 2, . . . , 6 from left to right in the slot.

According to an embodiment, the REs occupied by the 16-port CSI-RS configured for the UE may be any 16 REs selected from the REs occupied by the CSI-RS and the 8 newly added REs.

According to an embodiment, the REs occupied by the 16-port CSI-RS configured for the UE may be a combination of REs occupied by any two 8-port CSI-RSs or a combination of the REs occupied by an 8-port CSI-RS and the 8 newly added REs.

According to an embodiment, the REs occupied by the 16-port CSI-RS may be: REs corresponding to (k,l)={(7,5),(7,6),(4,5),(4,6)} of the first slot and REs corresponding to (k,l)={(9,2),(9,3),(8,2),(8,3),(3,2)(3,3),(2,2)(2,3),(7,5),(7,6)(4,5),(4,6)} of the second slot in each PRB.

According to an embodiment, the determination unit may specifically be configured to determine the information of the REs occupied by the 16-port CSI-RS configured for the UE according to the following method: determining CSI reference configuration information corresponding to the 8 newly added Res to be 5; and determining the information of the REs occupied by the 16-port CSI-RS to be (p,q), where p may be CSI reference configuration information corresponding to the first 8 REs in the REs occupied by the 16-port CSI-RS, and p=0, 1, 2, 3, 4, 5; and q may be CSI reference configuration information corresponding to the latter REs in the REs occupied by the 16-port CSI-RS, and q=0, 1, 2, 3, 4, 5.

According to an embodiment, the device for configuring a CSI-RS provided by the embodiments of the disclosure may further include a receiving unit.

The receiving unit is configured to receive CSI feedback information sent by the UE, wherein the CSI feedback information is determined based on a measurement result of CSI-RS measurement performed by the UE according to the configuration information of the CSI-RS.

The embodiments of the disclosure provide a base station, which may include the abovementioned device for configuring a CSI-RS.

The embodiments of the disclosure provide a method for feeding back CSI. The method may include the following actions.

Configuration information of a CSI-RS is received, where the configuration information of the CSI-RS includes information of REs occupied by a 16-port CSI-RS, and the REs occupied by the 16-port CSI-RS includes REs other than REs occupied by a PDCCH, a cell-specific RS and a UE-specific RS.

The CSI-RS is measured according to the configuration information of the CSI-RS.

CSI is fed back according to a measurement result.

The embodiments of the disclosure provide a device for feeding back CSI. The device may include a receiving unit, a measurement unit and a feedback unit.

The receiving unit is configured to receive configuration information of a CSI-RS, where the configuration information of the CSI-RS includes information of REs occupied by a 16-port CSI-RS, and the REs occupied by the 16-port CSI-RS includes REs other than REs occupied by a PDCCH, a cell-specific RS and a UE-specific RS.

The measurement unit is configured to measure the CSI-RS according to the configuration information of the CSI-RS.

The feedback unit is configured to feed back CSI according to a measurement result from the measurement unit.

The embodiments of the disclosure provide UE, which may include the abovementioned the device for feeding back CSI.

In the methods and devices for configuring a CSI-RS and for feeding back CSI and related equipment provided by the embodiments of the disclosure, a network side sends, to the UE, the configuration information of the 16-port CSI-RS configured for the UE, where the information of the REs occupied by the 16-port CSI-RS configured for the UE is included. The REs occupied by the 16-port CSI-RS include the REs other than the REs occupied by the PDCCH, the cell-specific RS and the UE-specific RS. The UE performs CSI-RS measurement according to the configuration information of the 16-port CSI-RS configured by the network side, and feeds back CSI to the network side according to the measurement result. Therefore, configuration of the 16-port CSI-RS and 16-port CSI-RS-based CSI-feedback are implemented.

The other characteristics and advantages of the disclosure will be elaborated in the following specification, and partially become obvious from the specification or are understood by implementing the disclosure. The purpose and other advantages of the disclosure may be achieved and obtained through structures particularly noted in the specification, the claims and the drawings.

BRIEF DESCRIPTION OF DRAWINGS

The drawings described here are adopted to provide a further understanding to the disclosure, and form a part of the disclosure. Schematic embodiments of the disclosure and descriptions thereof are adopted to explain the disclosure and not intended to form improper limits to the disclosure. In the drawings.

In the drawings.

Figure 1:
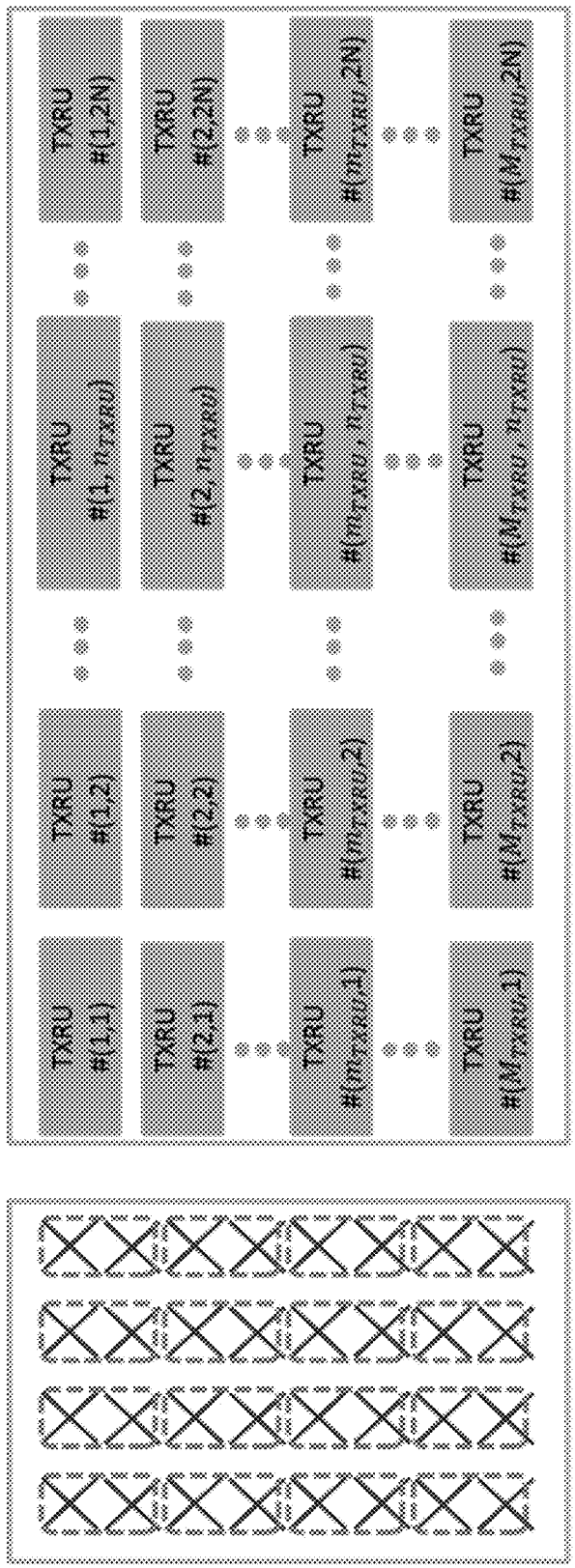
FIG. 1 is a schematic diagram of an antenna array and a TXRU array according to the related technology.
Figure 2:
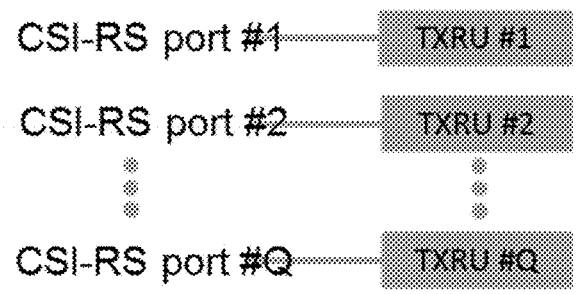
FIG. 2 is a mapping diagram of a CSI-RS port number and TXRUs in a first solution according to the related technology.
Figure 3:
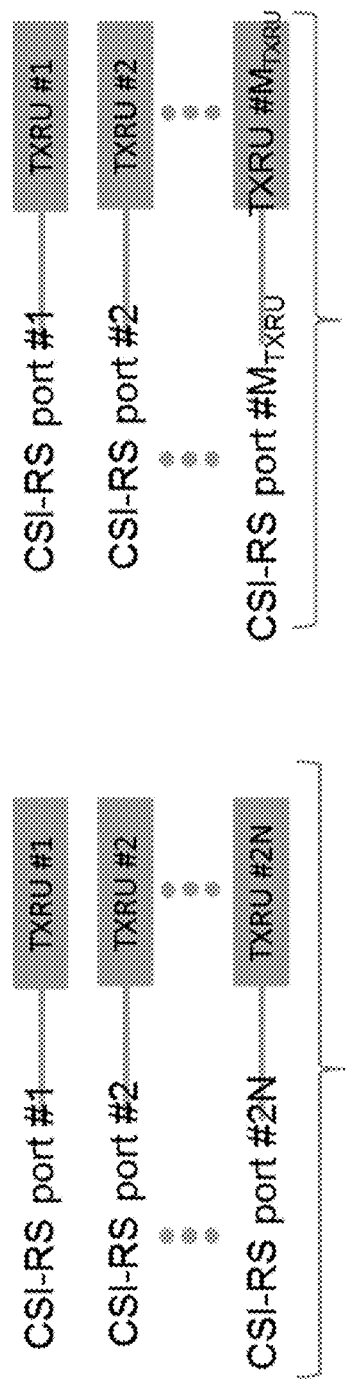
FIG. 3 is a mapping diagram of a CSI-RS port number and TXRUs in a second solution according to the related technology.
Figure 4:
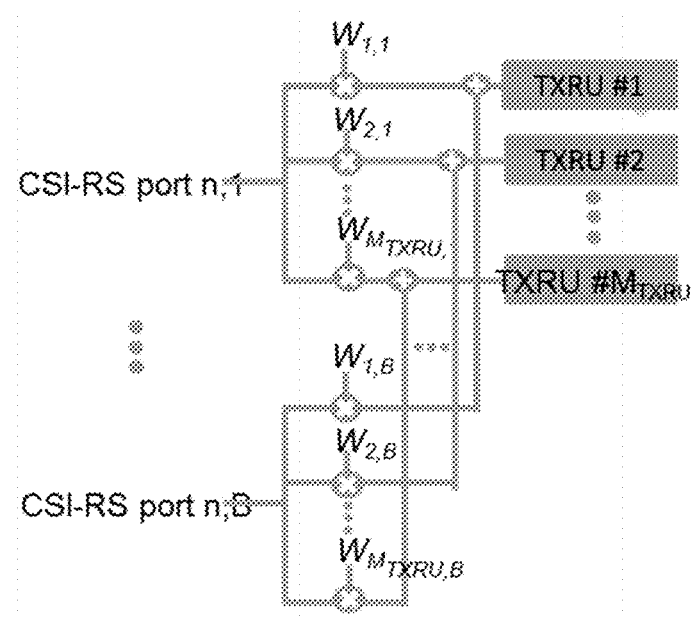
FIG. 4 is a mapping diagram of a CSI-RS port number and TXRUs in a third solution according to the related technology.

121 denotes an RE occupied by a DMRS in R8;
122 denotes an RE occupied by a DMRS in Release 9/10 (R9/10);
123 denotes an RE occupied by a cell-specific RS in R8;
124 denotes an RE occupied by a CSI-RS in the related technology;
125 denotes an RE occupied by a newly added CSI-RS in the embodiments of the disclosure;

In FIG. 5*a*-FIG. 5*f*:

a Code Division Multiplexing (CDM) group x represents antenna ports 0,1;
 a CDM group y represents antenna ports 2,3;
 a CDM group z represents antenna ports 4,5;
 a CDM group u represents antenna ports 6,7;

In FIG. 11*a*-FIG. 11*c*, FIG. 12 and FIG. 13:
 a CDM group a represents antenna ports 0,1;
 a CDM group b represents antenna ports 2,3;
 a CDM group c represents antenna ports 4,5;
 a CDM group d represents antenna ports 6,7;
 a CDM group e represents antenna ports 8,9;
 a CDM group f represents antenna ports 10,11;
 a CDM group g represents antenna ports 12,13; and
 a CDM group h represents antenna ports 14,15.

DETAILED DESCRIPTION

In order to implement configuration of 16-port CSI-RSs and perform CSI feedback on the basis of the 16-port CSI-RSs, the embodiments of the disclosure provide methods and devices for configuring a CSI-RS and for feeding back CSI and related equipment.

Optional embodiments of the disclosure will be described below in combination with the drawings of the specification. It should be understood that the optional embodiments described here are only adopted to describe and explain the disclosure and not intended to limit the disclosure. Moreover, the embodiments in the disclosure and characteristics in the embodiments may be combined without conflicts.

Figure 6A:
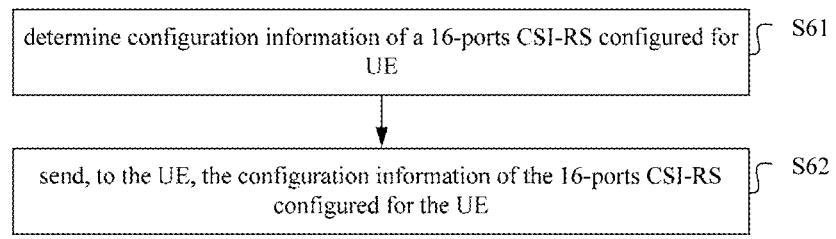
FIG. 6a is an implementation flowchart of a method for configuring a CSI-RS according to an embodiment of the disclosure.

FIG. 6*a* is an implementation flowchart of a method for configuring CSI-RSs according to an embodiment of the disclosure, including the following steps.

In S61, configuration information of 16-port CSI-RSs configured for UE is determined.

In S62, the configuration information of the 16-port CSI-RSs configured for the UE is sent to the UE.

Where, the configuration information of the CSI-RS includes information of REs occupied by the 16-port CSI-RSs configured for the UE. During specific implementation, the REs occupied by the 16-port CSI-RSs include REs other than REs occupied by a PDCCH, i.e. REs occupied by first OFDM symbols in each of PRBs, a cell-specific RS and a UE-specific RS.

Based on 40 REs occupied by CSI-RSs in the related technology, the embodiment of the disclosure provides two 16-port CSI-RS configuration manners.

A First Configuration Manner

The REs occupied by the 16-port CSI-RSs may be predetermined REs occupied by CSI-RSs, and namely are still the 40 REs in the related technology, and under such a configuration manner, the following two implementation modes may further be included.

A first implementation mode: any 16 REs may be selected from the REs occupied by the CSI-RSs in the related technology for the 16-port CSI-RS configured for the UE.

Optionally, for reducing interference between cells as much as possible, 16 REs occupied by 16-port CSI-RSs configured for UE of each cell preferably form a "rhombus".

Figure 6B:
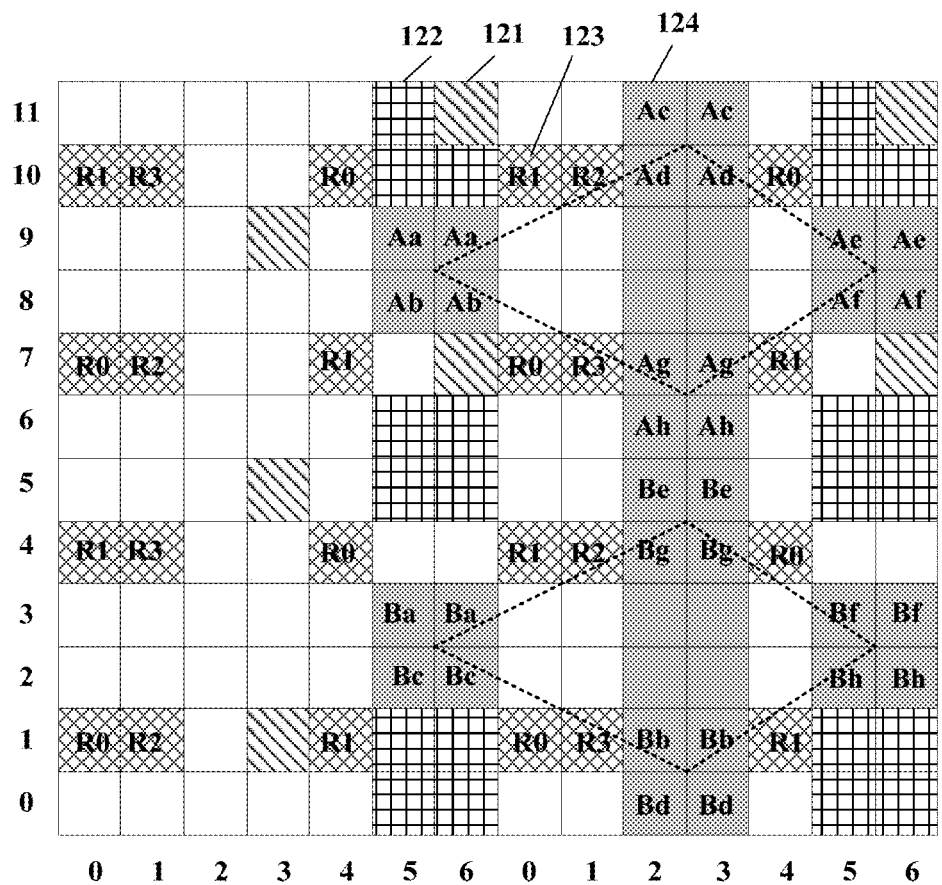
FIG. 6b is a schematic diagram of a first 16-port CSI-RS configuration manner according to an embodiment of the disclosure.

Specifically, FIG. 6*b* is a first possible schematic diagram, corresponding to the first implementation mode, of REs occupied by 16-port CSI-RSs. In FIG. 6*b*, the REs occupied by the 16-ports CSI-RS are: REs corresponding to (k,l)={(8,5),(8,6),(9,5),(9,6)} of a first slot and REs corresponding to (k,l)={(10,2),(10,3),(11,2),(11,3),(6,2)(6,3),(7,2)(7,3),(8,5),(8,6)(9,5),(9,6)} of a second slot in each of PRBs; or REs corresponding to (k,l)={(2,5),(2,6),(3,5),(3,6)} of the first slot and REs corresponding to (k,l)={(4, 2),(4,3),(5,2),(5,3),(1,2)(1,3),(0,2)(0,3),(2,5),(2,6)(3,5),(3,6)} of the second slot in each of the PRBs, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

After the REs occupied by the 16-port CSI-RSs configured for the UE of each cell are determined, a base station indicates configuration information of the 16-port CSI-RSs configured for the UE in the corresponding cell, i.e. information of the REs occupied by the 16-port CSI-RSs, to the UE through signaling. The UE performs measurement according to the configuration information of the 16-port CSI-RSs sent by the base station, and performs CSI feedback according to a measurement result.

A Second Implementation Mode

Figure 5A:
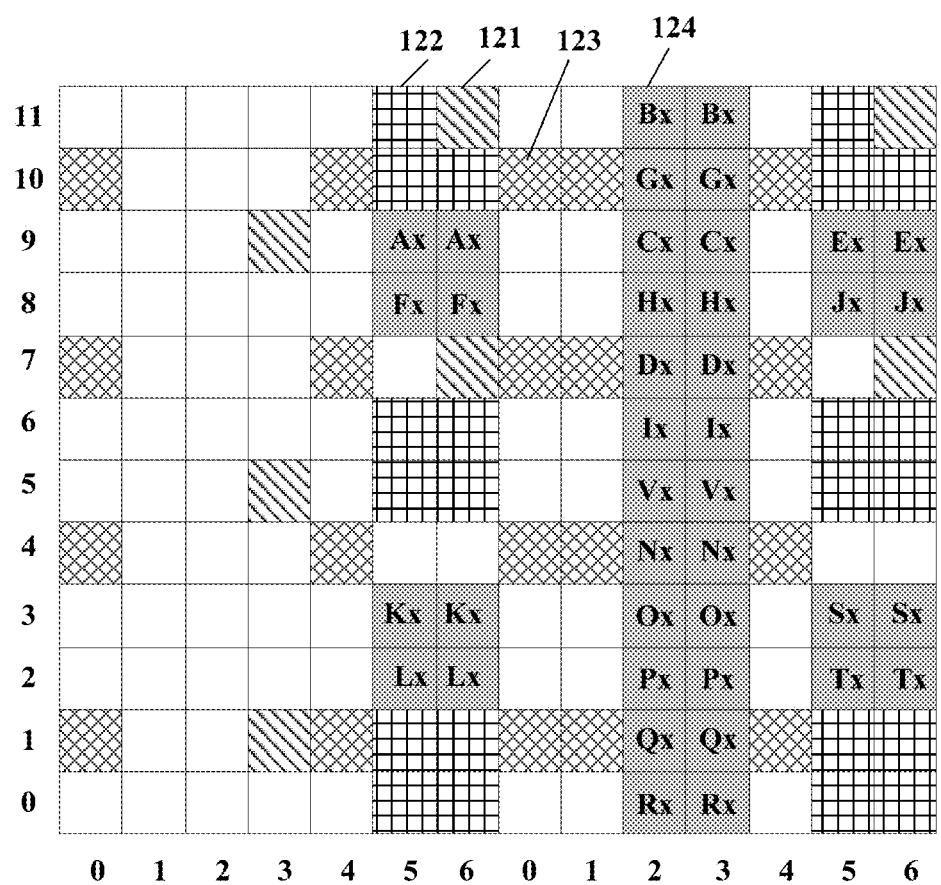
FIG. 5a-FIG. 5c are schematic diagrams of CSI-RS pattern designs applied to a frame structure type 1 (FDD) and a frame structure type 2 (TDD) according to the related technology.
Figure 5B:
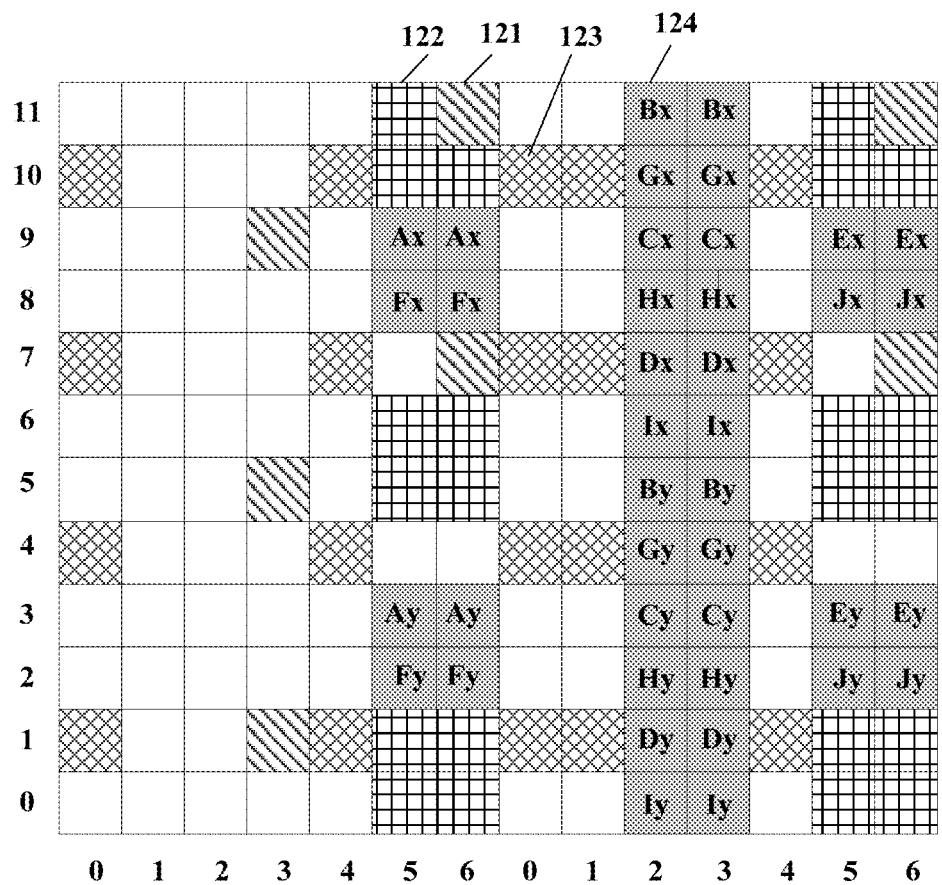
Figure 5C:
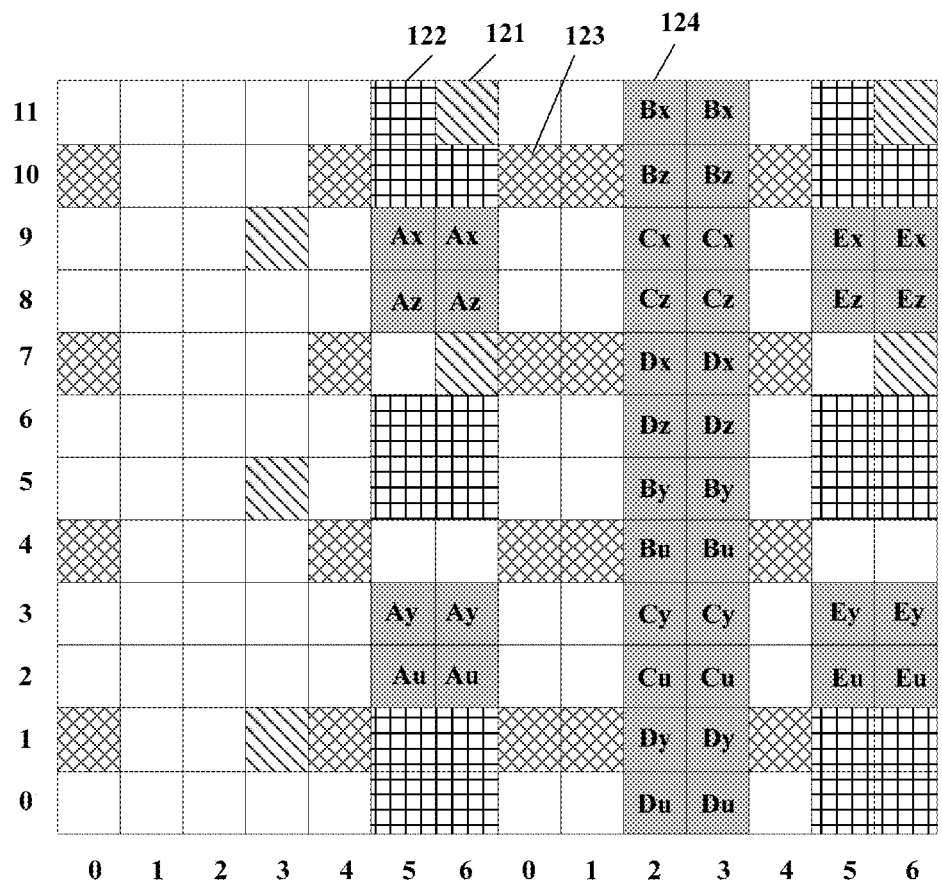
Figure 5D:
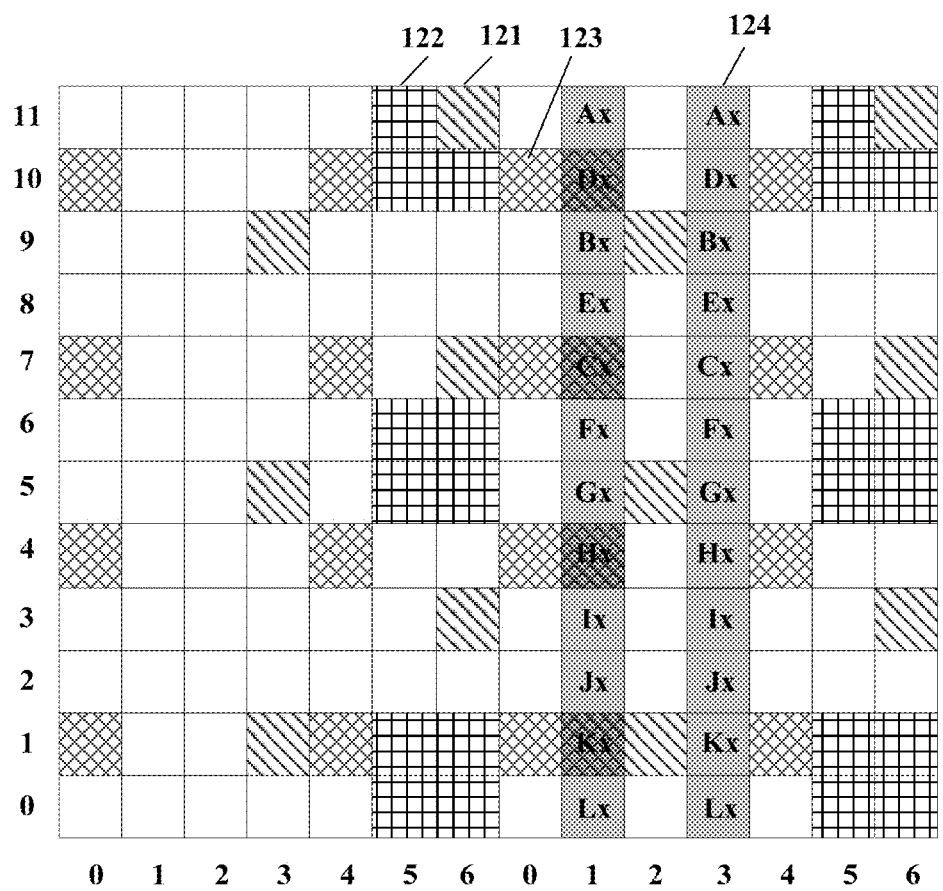
FIG. 5d-FIG. 5f are schematic diagrams of CSI-RS pattern designs applied to a frame data structure 2 (TDD) according to a conventional art.
Figure 5E:
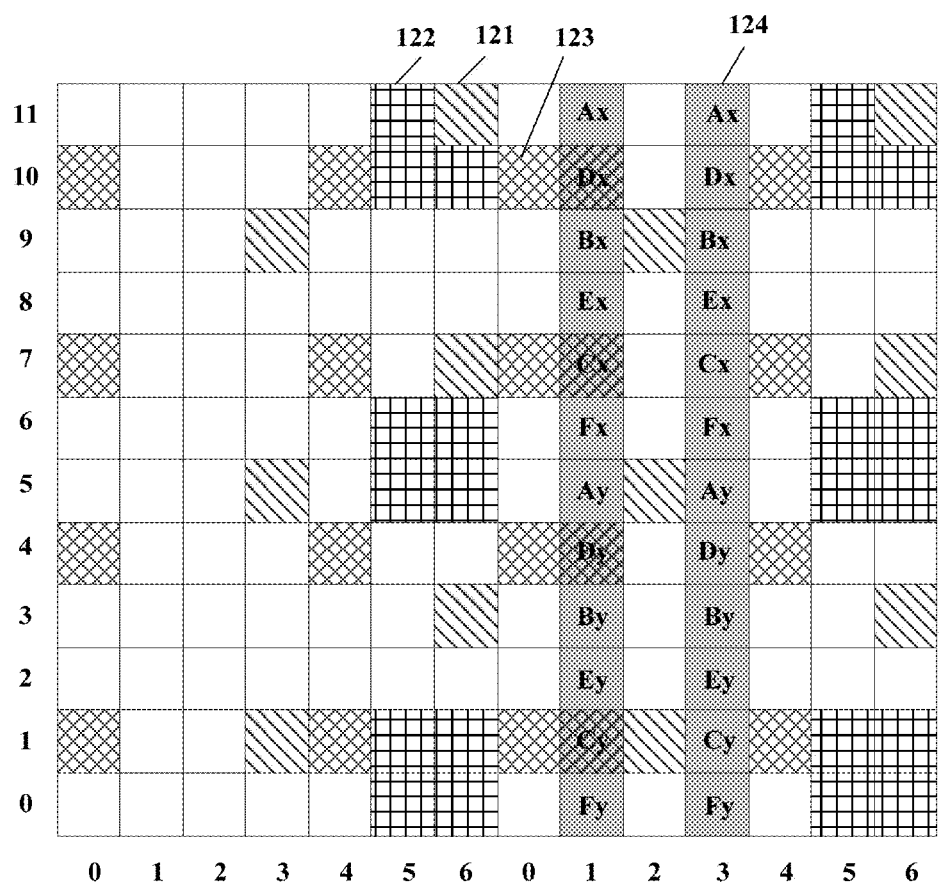
Figure 5F:
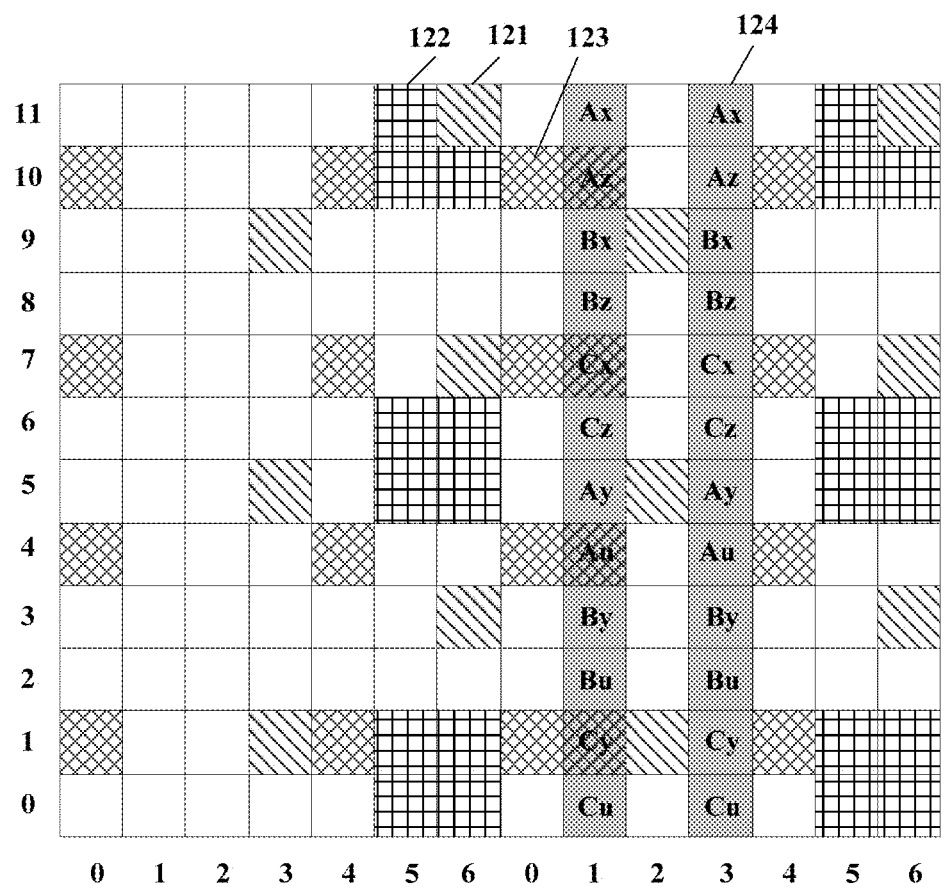

Optionally, during specific implementation, any two 8-port CSI-RSs may also be selected from 5 8-port CSI-RS configuration manners to form the 16-port CSI-RS on the basis of 8-port CSI-RS configuration manners. Under such a condition, the REs occupied by the 15-port CSI-RS configured for the UE may be a combination of REs occupied by any two 8-port CSI-RSs. FIG. 5*c* is a resource allocation diagram of configuring 8-port CSI-RSs for a cell A, a cell B, a cell C, a cell D and a cell E respectively (where CSI reference configuration information corresponding to the 8-port CSI-RS configured for the cell A is 0, CSI reference configuration information corresponding to the 8-port CSI-RS configured for the cell B is 1, CSI reference configuration information corresponding to the 8-port CSI-RS configured for the cell C is 2, CSI reference configuration information corresponding to the 8-port CSI-RS configured for the cell D is 3, and CSI reference configuration information corresponding to the 8-port CSI-RS configured for the cell E is 5). Each cell occupies 8 REs. On such a basis, in the embodiment of the disclosure, the REs occupied by the 8-port CSI-RSs configured for any two cells may be combined into the REs occupied by the 16-port CSI-RS. Since there are five orthogonal 8-port CSI-RS resource allocation manners in a system in the related technology, 2 groups of orthogonal 16-port resource allocation manners may be combined, and there is another 8-port CSI-RS resource allocation manner left. Under such a condition, orthogonal multiplexing between two neighbor cells may be supported, that is, an intercell frequency multiplexing factor is 2.

Figure 7A:
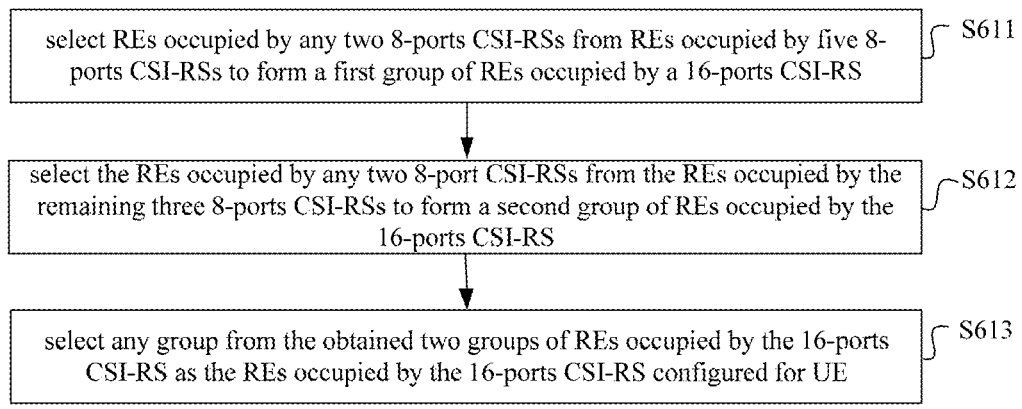
FIG. 7a is an implementation flowchart of determining REs occupied by a 16-port CSI-RS configured for UE when an intercell frequency multiplexing factor is 2 according to an embodiment of the disclosure.

On such a basis, as shown in FIG. 7*a*, the REs occupied by the 16-port CSI-RS configured for the UE may be determined in Step S61 according to the following method.

In S611, REs occupied by any two 8-port CSI-RSs are selected from REs occupied by five 8-port CSI-RSs to form a first group of REs occupied by the 16-port CSI-RS.

In S612, the REs occupied by any two 8-port CSI-RSs are selected from the REs occupied by the other three 8-port CSI-RSs to form a second group of REs occupied by the 16-port CSI-RS.

In S613, any group is selected from the obtained two groups of REs occupied by the 16-port CSI-RS as the REs occupied by the 16-port CSI-RS configured for the UE.

For reducing the interference between the cells as much as possible, the 16 REs occupied by the 16-port CSI-RS configured for the UE of each cell preferably form a "rhombus".

Figure 7B:
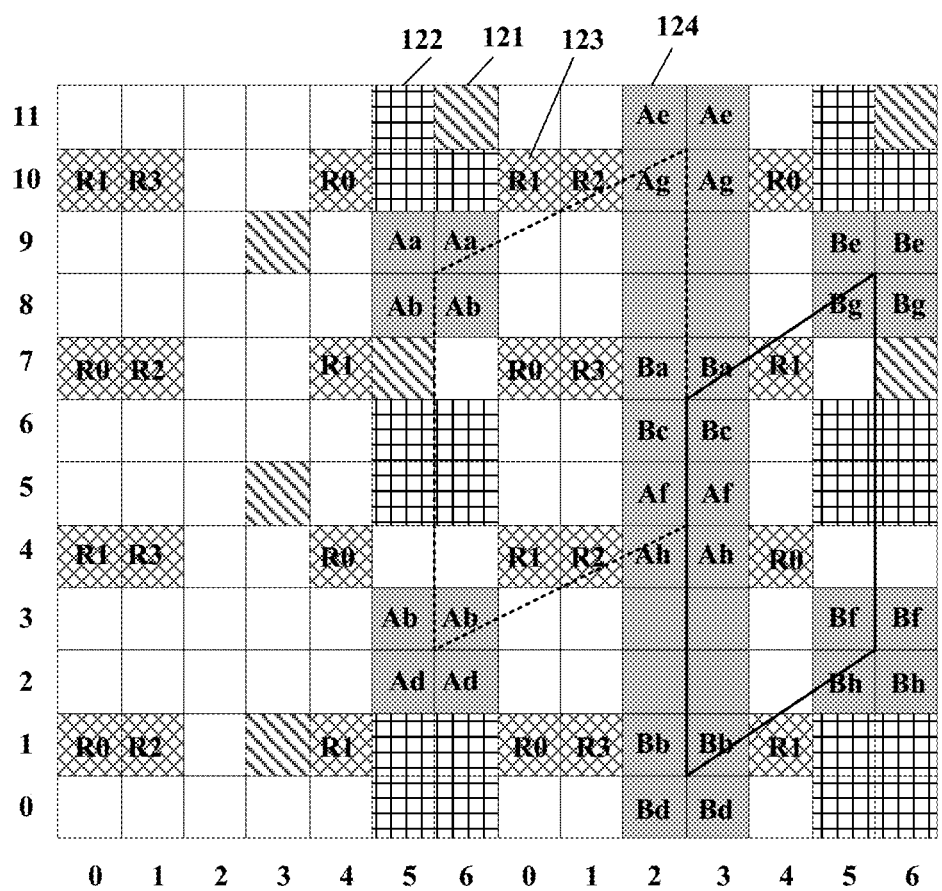
FIG. 7b is a schematic diagram of a second 16-port CSI-RS configuration manner according to an embodiment of the disclosure.
Figure 7C:
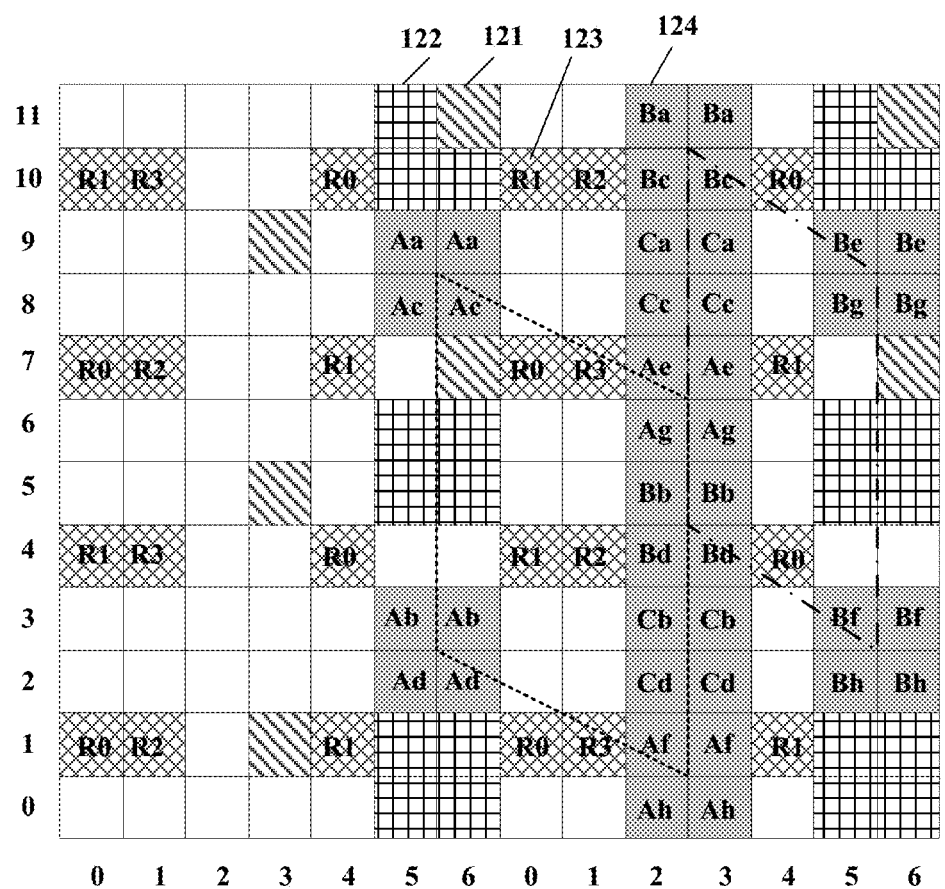
FIG. 7c is a schematic diagram of a third 16-port CSI-RS configuration manner according to an embodiment of the disclosure.

FIG. 7b and FIG. 7c are possible schematic diagrams, corresponding to the second implementation mode, of REs occupied by a 16-port CSI-RS respectively.

In FIG. 7b, the REs occupied by the 16-port CSI-RS are: REs corresponding to (k,l)={(8,5),(8,6),(9,5),(9,6),(2,5),(2,6),(3,5),(3,6)} of the first slot and REs corresponding to (k,l)={(10,2),(10,3),(11,2),(11,3),(4,2)(4,3),(5, 2)(5,3)} of the second slot in each of PRBs; or REs corresponding to (k,l)={(7,2),(7,3),(6,2),(6,3),(0,2)(0,3),(1,2)(I, 3),(9,5),(9,6), (8,5),(8,6),(3,5),(3,6),(2,5),(2,6)} of the second slot in each of the PRBs, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

After the REs occupied by the 16-port CSI-RS configured for the UE of each cell are determined, the base station indicates the configuration information of the 16-port CSI-RS configured for the UE in the corresponding cell, i.e. the information of the REs occupied by the 16-port CSI-RS, to the UE through signaling. The UE performs measurement according to the configuration information of the 16-port CSI-RS sent by the base station, and performs CSI feedback according to the measurement result.

In FIG. 7c, the REs occupied by the 16-port CSI-RS are: REs corresponding to (k,l)={(8,5),(8,6),(9,5),(9,6),(2,5),(2,6),(3,5),(3,6)} of the first slot and REs corresponding to (k,l)={(6,2),(6,3),(7,2),(7,3),(1,2)(1,3),(0,2)(0,3)} of the second slot in each of PRBs; or REs corresponding to (k,l)={(11,2),(11,3),(10,2),(10,3),(5,2)(5,3),(4, 2)(4,3),(9,5), (9,6),(8,5),(8,6),(3,5),(3,6),(2,5),(2,6)} of the second slot in each of the PRBs, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

After the REs occupied by the 16-port CSI-RS configured for the UE of each cell are determined, the base station indicates the configuration information of the 16-port CSI-RS configured for the UE in the corresponding cell, i.e. the information of the REs occupied by the 16-port CSI-RS, to the UE through signaling. The UE performs measurement according to the configuration information of the 16-port CSI-RS sent by the base station, and performs CSI feedback according to the measurement result.

Optionally, during specific implementation, the base station and the UE may adopt a predefined fixed 16-port CSI-RS configuration solution, that is, the base station indicates, to the UE, specific REs occupied by the 16-port CSI-RS configured for the UE through signaling. If the REs occupied by the 16-port CSI-RS configured for the UE are formed by the REs occupied by two 8-port CSI-RSs, a network-side real-time configuration solution may also be adopted, that is, a network side indicates the specific two 8-port CSI-RSs combined into the 16-port CSI-RS to the UE through signaling, that is, the base station may indicate, to the UE, CSI reference configuration information corresponding to each 8-port CSI-RS included in the REs occupied by the 16-port CSI-RS configured for the UE through signaling.

Specifically, the base station may determine the information of the REs occupied by the 16-port CSI-RS configured for the UE according to the following method: the information of the REs occupied by the 16-port CSI-RS is determined to be (p,q), where p is CSI reference configuration information corresponding to the REs occupied by the first 8-port CSI-RS in the REs occupied by the 16-port CSI-RS, and p=0, 1, 2, 3, 4; and q is CSI reference configuration information corresponding to the REs occupied by the second 8-port CSI-RS in the REs occupied by the 16-port CSI-RS, and q=0, 1, 2, 3, 4.

During specific implementation, if the REs occupied by the 16-port CSI-RS configured for the UE by the base station are shown in FIG. 7b, p=0 and q=1; or p=1 and q=0; or p=2 and q=4; or p=4 and q=2.

During specific implementation, if the REs occupied by the 16-port CSI-RS configured for the UE by the base station are shown in FIG. 7c, p=0 and q=3; or p=3 and q=0; or p=1 and q=4; or p=4 and q=1.

A Second Configuration Manner

For achieving relatively high system performance, 8 REs are added in the embodiment of the disclosure on the basis of resources occupied by the CSI-RS in the related technology, so that a system may support orthogonal multiplexing among 3 neighbor cells. Under such a condition, 8 REs are required to be selected from other REs, other than the REs occupied by the CSI-RS in the related technology, of a PRB to form 3 orthogonal 16-port CSI-RS resource allocation manners to support multiplexing among the 3 neighbor cells.

In this implementation mode, the REs occupied by the CSI-RS include predetermined REs occupied by a CSI-RS and 8 newly added REs.

When the 8 REs are selected from the other REs, other than the REs occupied by the CSI-RS in the related technology, of the PRB, the following principles are followed.

(1) First 3 OFDM symbols (configured for the PDCCH) are avoided, the REs which may be occupied by the UE-specific RS (Port 7/8/9/10/11/12/13/14) are avoided, and the REs which may be occupied by the cell-specific RS are avoided.

(2) REs which may be occupied by a DMRS for R8 (Port 5) are not required to be avoided, and this is because there may be few R8 terminals in the system when a network is upgraded to Release 13 (R13) and a small number of terminals using a TM7 may be avoided to be scheduled in a subframe including a CSI-RS.

(3) REs which are continuous in a time domain are selected as much as possible, which is favorable for adoption of a time-domain Orthogonal Cover Code (OCC) (consistency with an existing system is kept as much as possible to reduce complexity in implementation).

Figure 8:
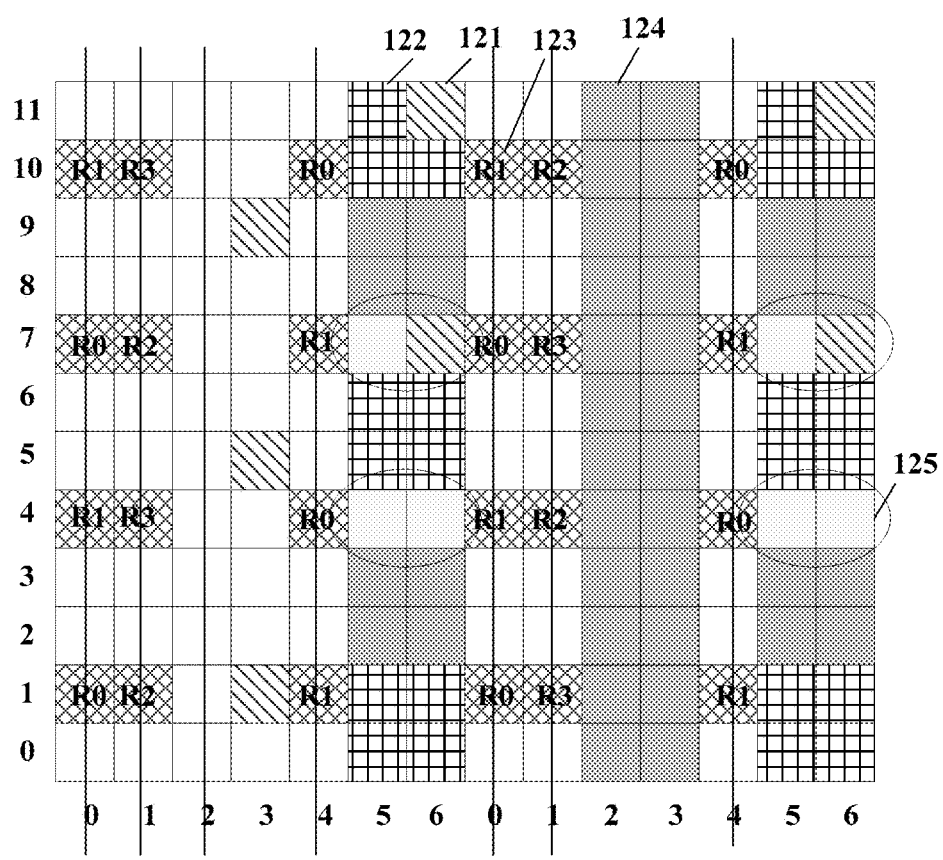
FIG. 8 is a schematic diagram of resource locations of 8 newly added REs according to an embodiment of the disclosure.

Based on the principles, optionally, FIG. 8 is a schematic diagram of resource locations of 8 newly added REs according to an embodiment of the disclosure, including: in case of a normal Cyclic Prefix (CP), the 8 REs shown in FIG. 8 are selected, and are specifically REs corresponding to (k,l)={(4,5),(4,6),(7,5),(7,6)} of the first slot and REs corresponding to (k,l)={(4,5),(4,6),(7,5),(7,6)} of the second slot in each of PRBs, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot, i.e. 8 REs included in 4 ellipses in FIG. 8.

On such a basis, in the embodiment of the disclosure, the 16-port CSI-RS may be configured for the UE through the following two implementation modes.

A Third Implementation Mode

Any 16 REs are selected from the known 40 REs and the 8 newly added REs as the REs occupied by the 16-port CSI-RS configured for the UE.

For reducing interference between the cells as much as possible, the 16 REs occupied by the 16-port CSI-RS configured for the UE of each cell preferably form a "rhombus".

Figure 11A:
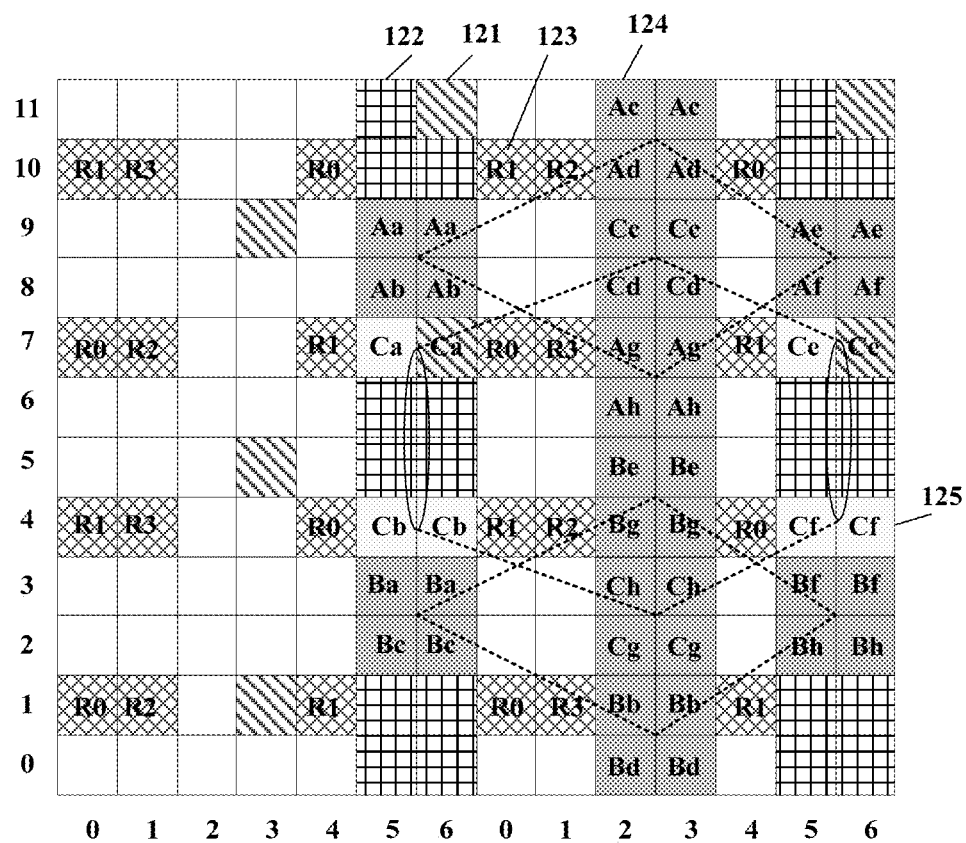
FIG. 11a is a schematic diagram of a fourth 16-port CSI-RS configuration manner according to an embodiment of the disclosure.

On the basis of the third implementation mode, FIG. 11*a* is a possible schematic diagram, corresponding to a third implementation mode, of REs occupied by a 16-port CSI-RS. In FIG. 11*a*, the Res occupied by the 16-port CSI-RS are: REs corresponding to (k,l)={(8,5),(8,6),(9,5),(9,6)} of the first slot and REs corresponding to (k,l)={(10,2),(10,3),(11,2),(11,3),(6,2)(6,3),(7,2)(7,3),(8,5),(8,6)(9,5),(9,6)} of the second slot in each of PRBs; or REs corresponding to (k,l)={(2,5),(2,6),(3,5),(3,6)} of the first slot and REs corresponding to (k,l)={(4,2),(4,3),(5,2),(5,3),(1,2)(1,3),(0,2)(0,3),(2,5),(2,6)(3,5),(3,6)} of the second slot in each of the PRBs; or REs corresponding to (k,l)={(7,5),(7,6),(4,5),(4,6)} of the first slot and REs corresponding to (k,l)={(9,2),(9,3),(8,2),(8,3),(3,2)(3,3),(2,2)(2,3),(7,5),(7,6)(4,5),(4,6)} of the second slot in each of the PRBs, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

A Fourth Implementation Mode

For convenient description, a group of 8 newly added REs is adopted as a sixth 8-port CSI-RS configuration manner below, and its corresponding CSI reference configuration information is 5. In such a manner, there are included totally 6 8-port CSI-RSs. During specific implementation, REs occupied by any two 8-port CSI-RSs may be selected to form the REs occupied by the 16-port CSI-RS. That is, the REs occupied by the 16-port CSI-RS configured for the UE are a combination of the REs occupied by any two 8-port CSI-RS or a combination of the REs occupied by an 8-port CSI-RS and the 8 newly added REs.

Figure 9:
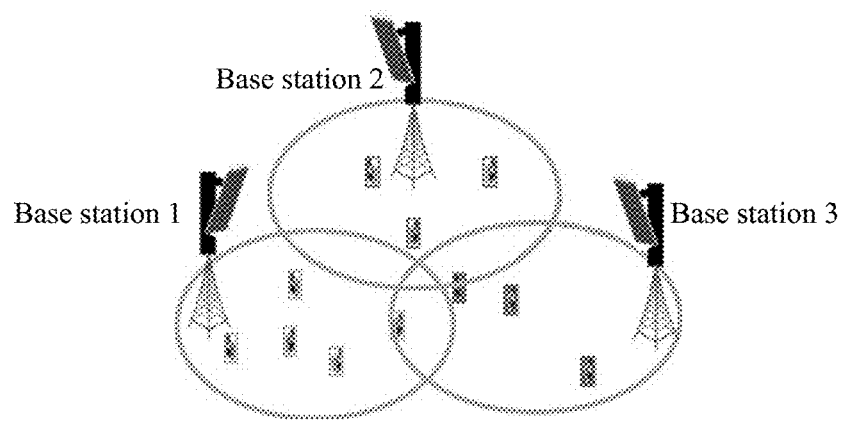
FIG. 9 is a schematic diagram of an application scenario when an intercell frequency multiplexing factor is 3 according to an embodiment of the disclosure.

During specific implementation, the known 40 REs occupied by the CSI-RS and the 8 newly added REs of the embodiment of the disclosure may form three groups of orthogonal 16-port CSI-RS configuration manners for multiplexing among the 3 cells, that is, the intercell frequency multiplexing factor is 3, as shown in FIG. 9.

Figure 10:
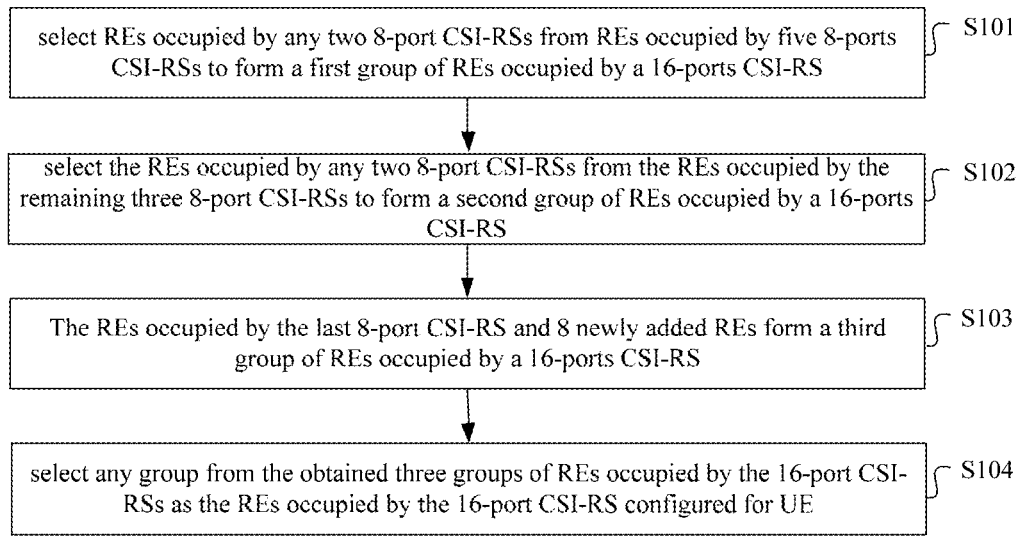
FIG. 10 is an implementation flowchart of determining REs occupied by a 16-port CSI-RS configured for UE when an intercell frequency multiplexing factor is 3 according to an embodiment of the disclosure.

On such a basis, in the embodiment of the disclosure, as shown in FIG. 10, the REs occupied by the 16-port CSI-RS configured for the UE may be determined in Step S61 according to, but not limited to, the following method.

In S101, the REs occupied by any two 8-port CSI-RSs are selected from the REs occupied by the five 8-port CSI-RSs to form a first group of REs occupied by the 16-port CSI-RS.

In S102, the REs occupied by any two 8-port CSI-RSs are selected from the REs occupied by the other three 8-port CSI-RSs to form a second group of REs occupied by the 16-port CSI-RS.

In S103, the REs occupied by the last 8-port CSI-RS and the 8 newly added REs form a third group of REs occupied by the 16-port CSI-RS.

In S104, any group is selected from the obtained three groups of REs occupied by the 16-port CSI-RS as the REs occupied by the 16-port CSI-RS configured for the UE.

During specific implementation, the 8 newly added REs form a group, and are combined with the predetermined REs occupied by the five 8-port CSI-RSs to form totally 6 groups of CSI-RS resource allocation manners. When a 16-port CSI-RS resource allocation combination is determined, besides implementation according to the method shown in FIG. 10, any two groups may also be selected from the 6 groups of CSI-RS resource allocation manners and combined into a 16-port CSI-RS resource allocation combination every time, to finally form three groups of orthogonal 16-port CSI-RS resource allocation manners for multiplexing among the 3 neighbor cells.

Figure 11B:
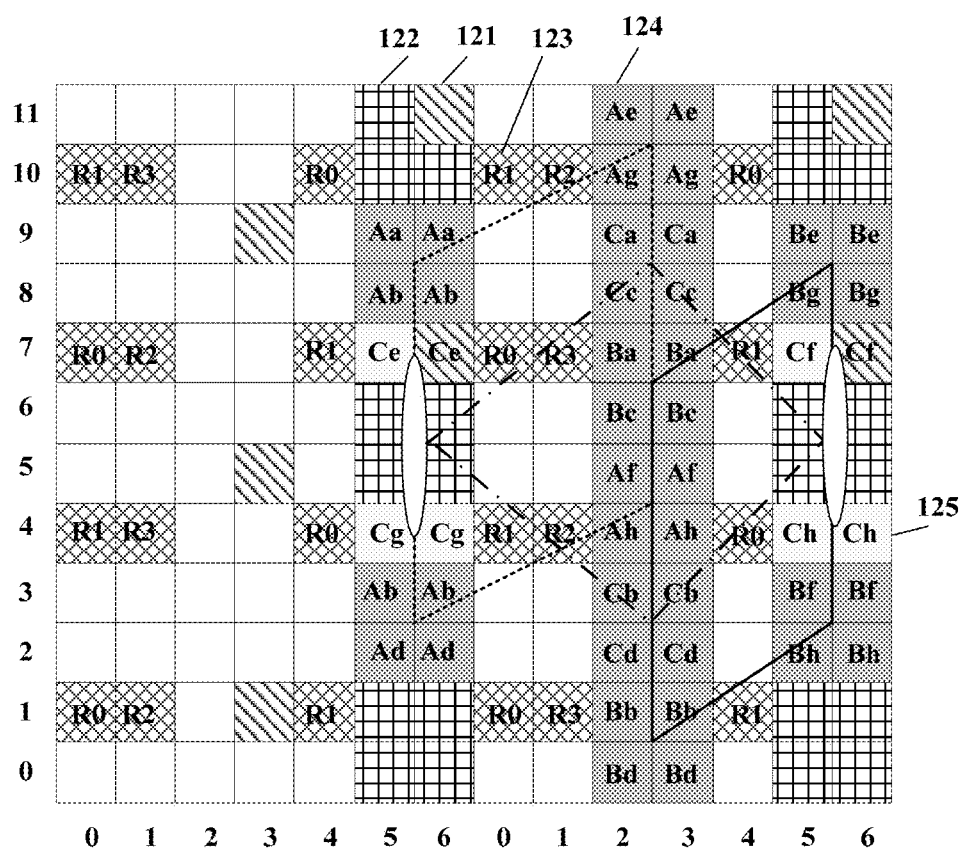
FIG. 11b is a schematic diagram of a fifth 16-port CSI-RS configuration manner according to an embodiment of the disclosure.
Figure 11C:
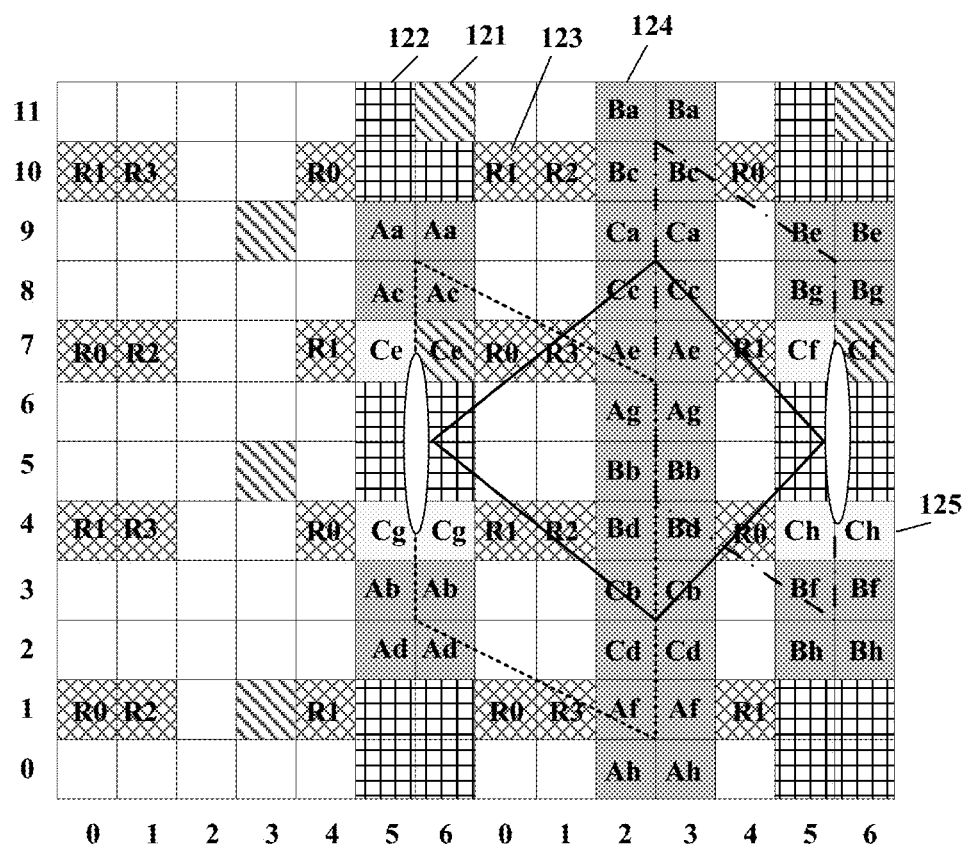
FIG. 11c is a schematic diagram of a sixth 16-port CSI-RS configuration manner according to an embodiment of the disclosure.

Optionally, for reducing the interference between the cells as much as possible, the 16 REs occupied by the 16-port CSI-RS configured for the UE preferably form a "rhombus", as shown in FIG. 11*b* and FIG. 11*c* respectively.

As shown in FIG. 11*b*, the REs occupied by the 16-port CSI-RS are:

REs corresponding to (k,l)={(8,5),(8,6),(9,5),(9,6),(2,5),(2,6),(3,5),(3,6)} of the first slot and REs corresponding to (k,l)={(10,2),(10,3),(11,2),(11,3),(4,2)(4,3),(5,2)(5,3)} of the second slot in each of PRBs, i.e. REs corresponding to {Aa,Ab,Ac,Ad,Ae,Af,Ag,Ah} in FIG. 11*b*; or REs corresponding to (k,l)={(7,2),(7,3),(6,2),(6,3),(0,2)(0,3),(1,2)(1,3),(9,5),(9,6),(8,5),(8,6),(3,5),(3,6),(2,5),(2,6)} of the second slot in each of the PRBs, i.e. REs corresponding to {Ba,Bb,Bc,Bd,Be,Bf,Bg,Bh} in FIG. 11*b*; or REs corresponding to (k,l)={(7,5),(7,6),(4,5),(4,6)} of the first slot and REs corresponding to (k,l)={(9,2),(9,3),(8,2),(8,3),(3,2)(3,3),(2,2)(2,3),(7,5),(7,6)(4,5),(4,6)} of the second slot in each of the PRBs, i.e. REs corresponding to {Ca,Cb,Cc,Cd,Ce,Cf,Cg,Ch} in FIG. 11*b*, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

After the REs occupied by the 16-port CSI-RS configured for the UE of each cell are determined, the base station indicates the configuration information of the 16-port CSI-RS configured for the UE in the corresponding cell, i.e. the information of the REs occupied by the 16-port CSI-RS, to the UE through signaling. The UE performs measurement according to the configuration information of the 16-port CSI-RS sent by the base station, and performs CSI feedback according to the measurement result. For example, a base station 1 indicates a cell 1 that REs occupied by a 16-port CSI-RS configured for it are the first group of REs occupied by the 16-port CSI-RS through signaling, a base station 2 indicates a cell 2 that REs occupied by a 16-port CSI-RS configured for it are the second group of REs occupied by the 16-port CSI-RS through signaling, and a base station 3 indicates a cell 3 that REs occupied by a 16-port CSI-RS configured for it are the third group of REs occupied by the 16-port CSI-RS through signaling.

As shown in FIG. 11*c*, the REs occupied by the 16-port CSI-RS are:

REs corresponding to (k,l)={(8,5),(8,6),(9,5),(9,6),(2,5),(2,6),(3,5),(3,6)} of the first slot and REs corresponding to (k,l)={(6,2),(6,3),(7,2),(7,3),(1,2)(1,3),(0,2)(0,3)} of the second slot in each of PRBs, i.e. REs corresponding to {Aa,Ab,Ac,Ad,Ae,Af,Ag,Ah} in FIG. 11*c*; or REs corresponding to (k,l)={(11,2),(11,3),(10,2),(10,3), (5,2)(5,3),(4,2)(4,3),(9,5),(9,6),(8,5),(8,6),(3,5),(3,6),(2,5), (2,6)} of the second slot in each of the PRBs, i.e. {Ba,Bb, Bc,Bd,Be,Bf,Bg,Bh} in FIG. 11c; or REs corresponding to (k,l)={(7,5),(7,6),(4,5),(4,6)} of the first slot and REs corresponding to (k,l)={(9,2),(9,3),(8,2), (8,3),(3,2)(3,3),(2,2)(2,3),(7,5),(7,6)(4,5),(4,6)} of the second slot in each of the PRBs, i.e. REs corresponding to {Ca,Cb,Cc,Cd,Ce,Cf,Cg,Ch} in FIG. 11c, where k is a subcarrier sequence number of a subcarrier included in the PRB and k is sequentially valued to be 0, 1, 2, ..., 11 from bottom to top; and l is an OFDM sequence number included in each of slots in the PRB and l is sequentially valued to be 0, 1, 2, ..., 6 from left to right in the slot.

After the REs occupied by the 16-port CSI-RS configured for the UE of each cell are determined, the base station indicates the configuration information of the 16-port CSI-RS configured for the UE in the corresponding cell, i.e. the information of the REs occupied by the 16-port CSI-RS, to the UE through signaling. The UE performs measurement according to the configuration information of the 16-port CSI-RS sent by the base station, and performs CSI feedback according to the measurement result. For example, the base station 1 indicates the cell 1 that the REs occupied by the 16-port CSI-RS configured for it are the first group of REs occupied by the 16-port CSI-RS through signaling, the base station 2 indicates the cell 2 that the REs occupied by the 16-port CSI-RS configured for it are the second group of REs occupied by the 16-port CSI-RS through signaling, and the base station 3 indicates the cell 3 that the REs occupied by the 16-port CSI-RS configured for it are the third group of REs occupied by the 16-port CSI-RS through signaling.

Optionally, during specific implementation, the base station and the UE may adopt the predefined fixed 16-port CSI-RS configuration solution, that is, the base station indicates, to the UE, the specific REs occupied by the 16-port CSI-RS configured for the UE through signaling. If the REs occupied by the 16-port CSI-RS configured for the UE are formed by the REs occupied by two 8-port CSI-RSs, the network-side real-time configuration solution may also be adopted, that is, the network side indicates the specific two 8-port CSI-RSs combined into the 16-port CSI-RS to the UE through signaling, that is, the base station may indicate, to the UE, the CSI reference configuration information corresponding to each 8-port CSI-RS included in the REs occupied by the 16-port CSI-RS configured for the UE through signaling. Specifically, during implementation of the disclosure, the information of the REs occupied by the 16-port CSI-RS configured for the UE may be determined according to the following method.

In Step 1, the CSI reference configuration information corresponding to the 8 newly added REs is determined to be 5.

In Step 2, the information of the REs occupied by the 16-port CSI-RS is determined to be (p,q), where p is CSI reference configuration information corresponding to the first 8 REs in the REs occupied by the 16-port CSI-RS, and p=0, 1, 2, 3, 4, 5; and q is CSI reference configuration information corresponding to the latter REs in the REs occupied by the 16-port CSI-RS, and q=0, 1, 2, 3, 4, 5.

Specifically, CSI reference configuration information corresponding to an existing 8-port CSI-RS is 0, 1, 2, 3, 4 respectively. It is defined that the CSI reference configuration information corresponding to the 8 newly added REs is 5.

Figure 12:
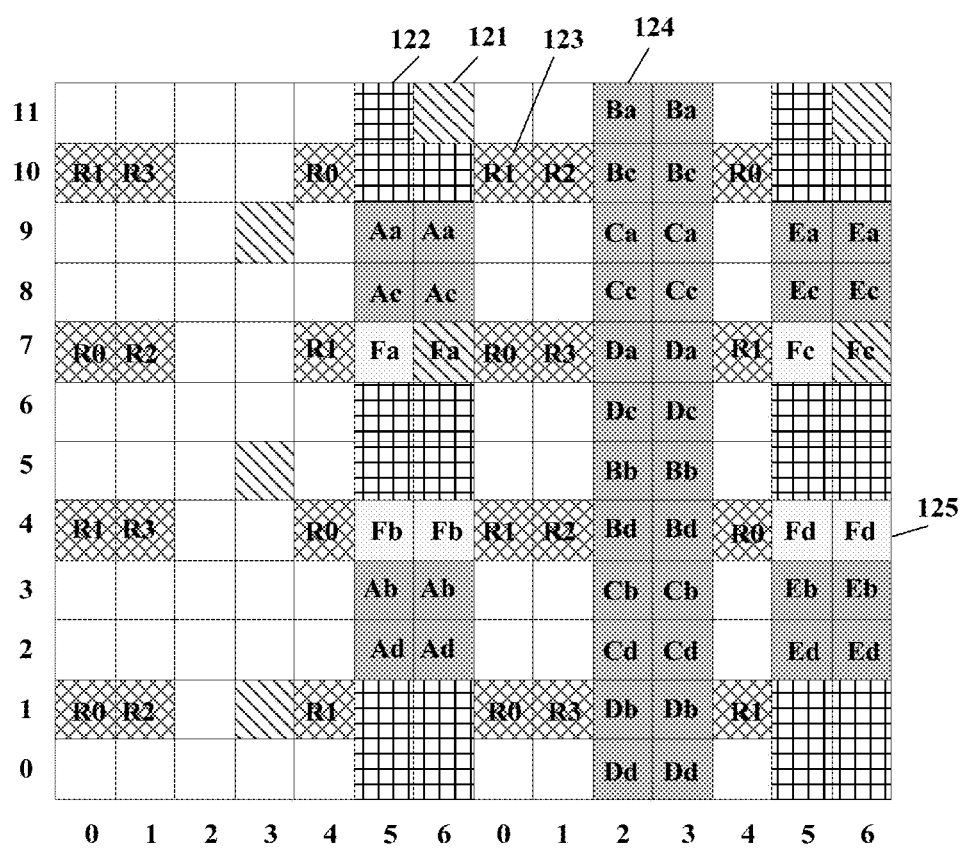
FIG. 12 is a schematic diagram of all REs occupied by a 16-port CSI-RS according to an embodiment of the disclosure.

As shown in FIG. 12, REs occupied by an 8-port CSI-RS of which CSI reference configuration information is 0 are {Aa,Ab,Ac,Ad} in FIG. 12, REs occupied by an 8-port CSI-RS of which CSI reference configuration information is 1 are {Ba,Bb,Bc,Bd} in FIG. 12, REs occupied by an 8-port CSI-RS of which CSI reference configuration information is 2 are {Ca,Cb,Cc,Cd} in FIG. 12, REs occupied by an 8-port CSI-RS of which CSI reference configuration information is 3 are {Da,Db,Dc,Dd} in FIG. 12, REs occupied by an 8-port CSI-RS of which CSI reference configuration information is 4 are {Ea,Eb,Ec,Ed} in FIG. 12, and REs occupied by an 8-port CSI-RS of which CSI reference configuration information is 5 are {Fa,Fb,Fc,Fd} in FIG. 12.

The CSI reference configuration information corresponding to the REs occupied by the 8-port CSI-RSs in the REs occupied by the 16-port CSI-RS configured for the UE or the 8 newly added REs respectively and combination sequence information of them forming the REs occupied by the 16-port CSI-RS are determined to be the information of the REs.

If the REs occupied by the 16-port CSI-RS configured for the UE by the base station are shown in FIG. 11c, the information of the REs occupied by the 16-port CSI-RS is as follows: p=0 and q=1; or p=1 and q=0; or p=2 and q=4; or p=4 and q=2; or p=3 and q=5; or p=5 and q=3.

If the REs occupied by the 16-port CSI-RS configured for the UE by the base station are shown in FIG. 11c, the information of the REs occupied by the 16-port CSI-RS is as follows: p=0 and q=3; or p=3 and q=0; or p=1 and q=4; or p=4 and q=1; or p=2 and q=5; or p=5 and q=2.

For example, the base station 1 indicates UE of the cell 1 that the REs occupied by the 16-port CSI-RS configured for it are formed by the REs occupied by the two 8-port CSI-RSs corresponding to the CSI reference configuration information 0 and 1 through signaling, and indicates the UE that the REs occupied by the two 8-port CSI-RSs corresponding to the CSI reference configuration information 0 are the first 8 REs forming the REs occupied by the 16-port CSI-RS and the REs occupied by the two 8-port CSI-RSs corresponding to the CSI reference configuration information 1 are the first 8 REs forming the REs occupied by the 16-port CSI-RS. Specifically, the base station may indicate the UE of the cell 1 by adopting a format (0,1), and if (1,0) is adopted, it is indicated that the REs occupied by the two 8-port CSI-RSs corresponding to the CSI reference configuration information 1 are the first 8 REs forming the REs occupied by the 16-port CSI-RS and the REs occupied by the two 8-port CSI-RSs corresponding to the CSI reference configuration information 0 are the first 8 REs forming the REs occupied by the 16-port CSI-RS.

The base station 2 indicates UE of the cell 2 that the REs occupied by the 16-port CSI-RS configured for it are formed by the REs occupied by the two 8-port CSI-RSs corresponding to the CSI reference configuration information 2 and 3 through signaling, and indicates the UE that the REs occupied by the two 8-port CSI-RSs corresponding to the CSI reference configuration information 2 are the first 8 REs forming the REs occupied by the 16-port CSI-RS and the REs occupied by the two 8-port CSI-RSs corresponding to the CSI reference configuration information 3 are the first 8 REs forming the REs occupied by the 16-port CSI-RS. Specifically, the base station may indicate the UE of the cell 1 by adopting a format (2,3), and if (3,2) is adopted, it is indicated that the REs occupied by the two 8-port CSI-RSs corresponding to the CSI reference configuration information 3 are the first 8 REs forming the REs occupied by the 16-port CSI-RS and the REs occupied by the two 8-port CSI-RSs corresponding to the CSI reference configuration information 2 are the first 8 REs forming the REs occupied by the 16-port CSI-RS.

The base station 3 indicates UE of the cell 3 that the REs occupied by the 16-port CSI-RS configured for it are formed by the REs occupied by the two 8-port CSI-RSs corresponding to the CSI reference configuration information 4 and 5 through signaling, and indicates the UE that the REs occupied by the two 8-port CSI-RSs corresponding to the CSI reference configuration information 4 are the first 8 REs forming the REs occupied by the 16-port CSI-RS and the REs occupied by the two 8-port CSI-RSs corresponding to the CSI reference configuration information 5 are the first 8 REs forming the REs occupied by the 16-port CSI-RS. Specifically, the base station may indicate the UE of the cell 1 by adopting a format (4,5), and if (5,4) is adopted, it is indicated that the REs occupied by the two 8-port CSI-RSs corresponding to the CSI reference configuration information 5 are the first 8 REs forming the REs occupied by the 16-port CSI-RS and the REs occupied by the two 8-port CSI-RSs corresponding to the CSI reference configuration information 4 are the first 8 REs forming the REs occupied by the 16-port CSI-RS.

Figure 13:
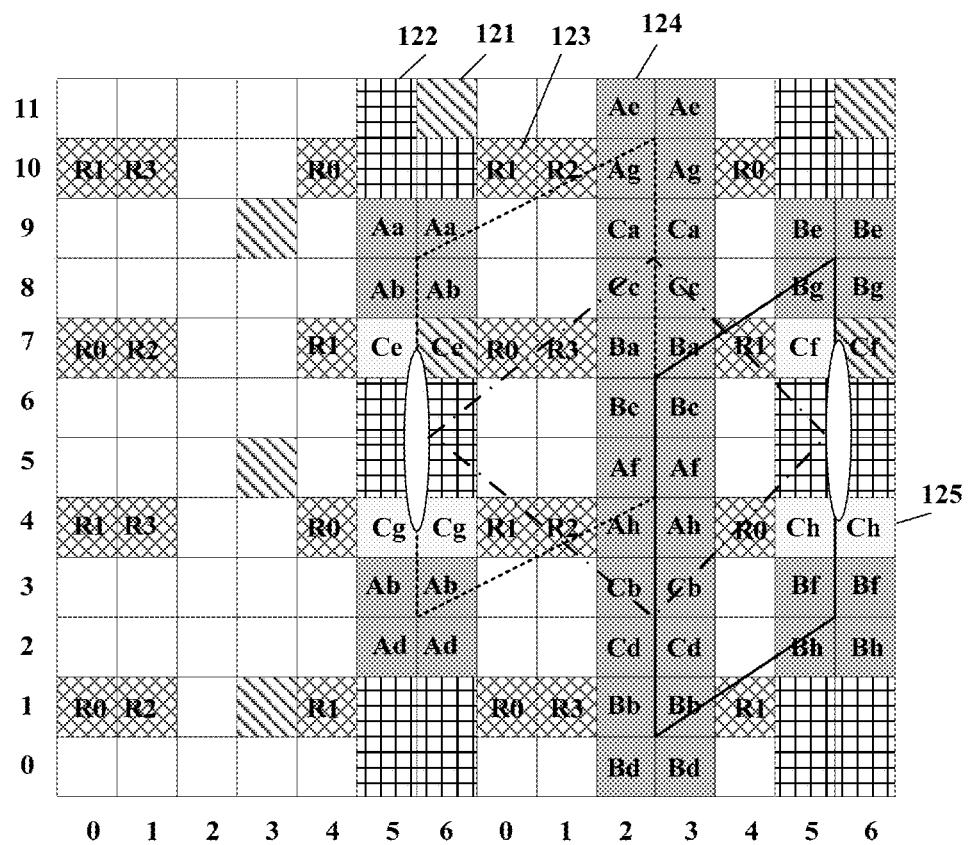
FIG. 13 is a schematic diagram of a fourth 16-port CSI-RS configuration manner when an intercell reuse factor is 3 according to an embodiment of the disclosure.

Specifically, FIG. 13 is a schematic diagram of REs occupied by 16-port CSI-RSs configured for UE within respective coverages by three base stations according to FIG. 11b when an intercell multiplexing factor is 3, where the REs occupied by the 16-port CSI-RSs configured for the UE within the respective coverages by the base station 1, the base station 2 and the base station 3 are:

REs corresponding to (k,l)={(8,5),(8,6),(9,5),(9,6),(2,5),(2,6),(3,5),(3,6)} of the first slot and REs corresponding to (k,l)={(11,2),(11,3),(10,2),(10,3),(5,2)(5,3),(4,2)(4,3)} of the second slot in each of the PRBs, i.e. REs corresponding to {Aa,Ab,Ac,Ad,Ae,Af,Ag,Ah} in FIG. 12; or REs corresponding to (k,l)={(7,2),(7,3),(6,2),(6,3),(9,5),(9,6),(8,5),(8,6),(1,2),(1,3),(0,2)(0,3),(3,5),(3,6),(2,5),(2,6)} of the second slot in each of the PRBs, i.e. REs corresponding to {Ba,Bb,Bc,Bd,Be,Bf,Bg,Bh} in FIG. 12; or REs corresponding to (k,l)={(7,5),(7,6),(4,5),(4,6)} of the first slot and REs corresponding to (k,l)={(9,2),(9,3),(8,2),(8,3),(3,2)(3,3),(2,2)(2,3),(7,5),(7,6)(4,5),(4,6)} of the second slot in each of the PRBs, i.e. REs corresponding to {Ca,Cb,Cc,Cd,Ce,Cf,Cg,Ch} in FIG. 11a, where k is a subcarrier sequence number of a subcarrier included in the PRB and k is sequentially valued to be 0, 1, 2, ..., 11 from bottom to top; and l is an OFDM sequence number included in each of slots in the PRB and l is sequentially valued to be 0, 1, 2, ..., 6 from left to right in the slot.

The base station 1 notifies the UE of the CSI reference configuration information respectively corresponding to the REs occupied by the 8-port CSI-RSs or 8 newly added REs forming the REs occupied by the 16-port CSI-RS configured for the UE in the cell 1 and combination sequence information of them forming the REs occupied by the 16-port CSI-RS through signaling, the base station 2 notifies the UE of the CSI reference configuration information respectively corresponding to the REs occupied by the 8-port CSI-RSs or 8 newly added REs forming the REs occupied by the 16-port CSI-RS configured for the UE in the cell 2 and combination sequence information of them forming the REs occupied by the 16-port CSI-RS through signaling, and the base station 3 notifies the UE of the CSI reference configuration information respectively corresponding to the REs occupied by the 8-port CSI-RSs or 8 newly added REs forming the REs occupied by the 16-port CSI-RS configured for the UE in the cell 3 and combination sequence information of them forming the REs occupied by the 16-port CSI-RS through signaling.

In the method for configuring 16-port CSI-RS provided by the embodiment of the disclosure, the existing 5 8-port CSI-RSs form two groups of 16-port CSI-RS configuration manner for multiplexing between two cells, or 8 REs are added on the basis of the predetermined REs occupied by the CSI-RS to form three groups of 16-port CSI-RS configuration manners for multiplexing among three cells. Therefore, 16-port CSI-RS configuration is implemented. The configuration information of the CSI-RS configured for the UE is notified to the UE through signaling, where the base station may notify the UE of the specific REs occupied by the 16-port CSI-RS configured for it when notifying the UE of the configuration information of the 16-port CSI-RS configured for it, and may also notify the UE of the CSI reference configuration information corresponding to the 16-port CSI-RS configured for use, and then this terminal may perform CSI-RS measurement according to the received configuration information and perform CSI feedback according to the measurement result. Therefore, configuration of the 16-port CSI-RS, i.e. 16-port CSI feedback, is implemented.

Based on the same inventive concept, the embodiments of the disclosure further provide a device for configuring a CSI-RS, a method and device for feeding back CSI implemented by equipment, i.e. UE, and the equipment. Since the principle adopted by the method, the device and the equipment for solving problems is similar to the method for configuring CSI-RS, implementation of the method, the device and the equipment may refer to implementation of the method for configuring CSI-RS, and repeated parts will not be elaborated.

Figure 14:
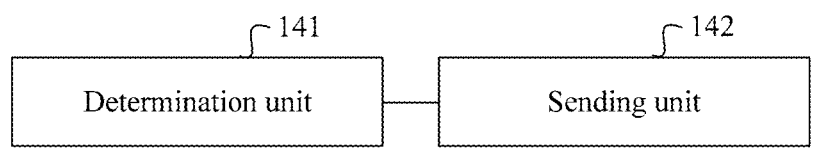
FIG. 14 is a structure diagram of a device for configuring a CSI-RS according to an embodiment of the disclosure.

FIG. 14 is a structure diagram of a device for configuring a CSI-RS according to an embodiment of the disclosure, which may include:

a determination unit 141, configured to determine configuration information of a 16-port CSI-RS configured for UE, where the configuration information of the CSI-RS includes information of REs occupied by the 16-port CSI-RS configured for the UE, and the REs occupied by the 16-port CSI-RS include REs other than REs occupied by a PDCCH, a cell-specific RS and a UE-specific RS; and a sending unit 142, configured to send, to the UE, the configuration information of the 16-port CSI-RS configured for the UE.

During specific implementation, the REs occupied by the CSI-RS may be predetermined REs occupied by a CSI-RS; and the REs occupied by the 16-port CSI-RS configured for the UE may be any 16 REs selected from the predetermined REs occupied by the CSI-RS.

Optionally, the REs occupied by the 16-port CSI-RS configured for the UE by a base station may be:

REs corresponding to (k,l)={(8,5),(8,6),(9,5),(9,6)} of a first slot and REs corresponding to (k,l)={(10,2),(10,3),(11,2),(11,3),(6,2)(6,3),(7,2)(7,3),(8,5),(8,6)(9,5),(9,6)} of a second slot in each of the PRBs; or REs corresponding to (k,l)={(2,5),(2,6),(3,5),(3,6)} of the first slot and REs corresponding to (k,l)={(4,2),(4,3),(5,2),(5,3),(1,2)(1,3),(0,2)(0,3),(2,5),(2,6)(3,5),(3,6)} of the second slot in each of the PRBs, where k is a subcarrier sequence number of a subcarrier included in the PRB and k is sequentially valued to be 0, 1, 2, ..., 11 from bottom to top; and l is an OFDM sequence number included in each of slots in the PRB and l is sequentially valued to be 0, 1, 2, . . . , 6 from left to right in the slot.

During specific implementation, the REs occupied by the CSI-RS are predetermined REs occupied by a CSI-RS; and the REs occupied by the 16-port CSI-RS configured for the UE are a combination of REs occupied by any two 8-port CSI-RSs.

Optionally, the REs occupied by the 16-port CSI-RS configured for the UE by the base station may be:

REs corresponding to (k,l)={(8,5),(8,6),(9,5),(9,6),(2,5),(2,6),(3,5),(3,6)} of the first slot and REs corresponding to (k,l)={(10,2),(10,3),(11,2),(11,3),(4,2)(4,3),(5,2)(5,3)} of the second slot in each of the PRBs; or REs corresponding to (k,l)={(7,2),(7,3),(6,2),(6,3),(0,2)(1,3),(1,2)(1,3),(9,5),(9,6),(8,5),(8,6),(3,5),(3,6),(2,5),(2,6)} of the second slot in each of the PRBs, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

Optionally, the REs occupied by the 16-port CSI-RS configured for the UE by the base station are:

REs corresponding to (k,l)={(8,5),(8,6),(9,5),(9,6),(2,5),(2,6),(3,5),(3,6)} of the first slot and REs corresponding to (k,l)={(6,2),(6,3),(7,2),(7,3),(1,2)(1,3),(0,2)(0,3)} of the second slot in each of PRBs; or REs corresponding to (k,l)={(11,2),(11,3),(10,2),(10,3),(5,2)(5,3),(4,2)(4,3),(9,5),(9,6),(8,5),(8,6),(3,5),(3,6),(2,5),(2,6)} of the second slot in each of the PRBs, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

During specific implementation, the determination unit 141 is specifically configured to determine the information of the REs occupied by the 16-port CSI-RS configured for the UE according to the following method: determining the information of the REs occupied by the 16-port CSI-RS to be (p,q), where p is CSI reference configuration information corresponding to the REs occupied by the first 8-port CSI-RS in the REs occupied by the 16-port CSI-RS, and p=0, 1, 2, 3, 4; and q is CSI reference configuration information corresponding to the REs occupied by the second 8-port CSI-RS in the REs occupied by the 16-port CSI-RS, and q=0, 1, 2, 3, 4.

Optionally, the information of the REs occupied by the 16-port CSI-RS is as follows: p=0 and q=1; or p=1 and q=0, or p=0 and q=3; or p=3 and q=0, or p=2 and q=4; or p=4 and q=2 or p=1 and q=4; or p=4 and q=1.

During specific implementation, the REs occupied by the CSI-RS may further include predetermined REs occupied by a CSI-RS and 8 newly added REs.

When the 8 REs are selected from the other REs, other than the predetermined REs occupied by the CSI-RS, of the PRB, the following principles are followed.

(1) First 3 OFDM symbols (configured for the PDCCH) are avoided, the REs which may be occupied by the UE-specific RS (Port 7/8/9/10/11/12/13/14) are avoided, and the REs which may be occupied by the cell-specific RS are avoided.

(2) REs which may be occupied by a DMRS for R8 (Port 5) are not required to be avoided, and this is because there may be few R8 terminals in the system when a network is upgraded to Release 13 (R13) and a small number of terminals using a TM7 may be avoided to be scheduled in a subframe including a CSI-RS.

(3) REs which are continuous in a time domain are selected as much as possible, which is favorable for adoption of a time-domain OCC (consistency with an existing system is kept as much as possible to reduce complexity in implementation).

Optionally, the newly added REs include REs corresponding to (k,l)={(4,5),(4,6),(7,5),(7,6)} of the first slot and REs corresponding to (k,l)={(4,5),(4,6),(7,5),(7,6)} of the second slot in each of the PRBs, where k is a subcarrier sequence number of a subcarrier included in each of the PRBs and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

Optionally, the REs occupied by the 16-port CSI-RS configured for the UE by the base station are any 16 REs selected from the REs occupied by the CSI-RS and the 8 newly added REs.

Specifically, the REs occupied by the 16-port CSI-RS configured for the UE by the base station are:

REs corresponding to (k,l)={(8,5),(8,6),(9,5),(9,6)} of the first slot and REs corresponding to (k,l)={(10,2),(10,3),(11,2),(11,3),(6,2)(6,3),(7,2)(7,3),(8,5),(8,6)(9,5),(9,6)} of the second slot in each of PRBs; or REs corresponding to (k,l)={(2,5),(2,6),(3,5),(3,6)} of the first slot and REs corresponding to (k,l)={(4,2),(4,3),(5,2),(5,3),(1,2)(1,3),(0,2)(0,3),(2,5),(2,6)(3,5),(3,6)} of the second slot in each of PRBs; or REs corresponding to (k,l)={(7,5),(7,6),(4,5),(4,6)} of the first slot and REs corresponding to (k,l)={(9,2),(9,3),(8,2),(8,3),(3,2)(3,3),(2,2)(2,3),(7,5),(7,6)(4,5),(4,6)} of the second slot in each of the PRBs, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

During specific implementation, the REs occupied by the 16-port CSI-RS configured for the UE by the base station are a combination of REs occupied by any two 8-port CSI-RSs or a combination of the REs occupied by an 8-port CSI-RS and the 8 newly added REs.

Specifically, the REs occupied by the 16-port CSI-RS configured for the UE by the base station are:

REs corresponding to (k,l)={(8,5),(8,6),(9,5),(9,6),(2,5),(2,6),(3,5),(3,6)} of the first slot and REs corresponding to (k,l)={(10,2),(10,3),(11,2),(11,3),(4,2)(4,3),(5,2)(5,3)} of the second slot in each of PRBs; or REs corresponding to (k,l)={(7,2),(7,3),(6,2),(6,3),(0,2)(0,3),(1,2)(1,3),(9,5),(9,6),(8,5),(8,6),(3,5),(3,6),(2,5),(2,6)} of the second slot in each of PRBs; or REs corresponding to (k,l)={(7,5),(7,6),(4,5),(4,6)} of the first slot and REs corresponding to (k,l)={(9,2),(9,3),(8,2),(8,3),(3,2)(3,3),(2,2)(2,3),(7,5),(7,6)(4,5),(4,6)} of the second slot in each of the PRBs, where k is a subcarrier sequence number of a subcarrier included in the PRB and k is sequentially valued to be 0, 1, 2, . . . , 11 from bottom to top; and l is an OFDM sequence number included in each of slots in the PRB and l is sequentially valued to be 0, 1, 2, . . . , 6 from left to right in the slot.

Specifically, the REs occupied by the 16-port CSI-RS configured for the UE by the base station are:

REs corresponding to (k,l)={(8,5),(8,6),(9,5),(9,6),(2,5),(2,6),(3,5),(3,6)} of the first slot and REs corresponding to (k,l)={(6,2),(6,3),(7,2),(7,3),(1,2)(1,3),(0,2)(0,3)} of the second slot in each of PRBs; or REs corresponding to (k,l)={(11,2),(11,3),(10,2)(10,3)(5,2)(5,3),(4,2)(4,3),(9,5),(9,6),(8,5),(8,6),(3,5),(3,6),(2,5),(2,6)} of the second slot in each of PRBs; or REs corresponding to (k,l)={(7,5),(7,6),(4,5),(4,6)} of the first slot and REs corresponding to (k,l)={(9,2),(9,3),(8,2),(8,3),(3,2)(3,3),(2,2)(2,3),(7,5),(7,6)(4,5),(4,6)} of the second slot in each of the PRBs, where k is a subcarrier sequence number of a subcarrier included in the PRB and k is sequentially valued to be 0, 1, 2, ... , 11 from bottom to top; and l is an OFDM sequence number included in each of slots in the PRB and l is sequentially valued to be 0, 1, 2, ... , 6 from left to right in the slot.

Optionally, during specific implementation, the determination unit 141 may be configured to determine the information of the REs occupied by the 16-port CSI-RS configured for the UE according to the following method: determining the CSI reference configuration information corresponding to the 8 newly added REs to be 5; and determining the information of the REs occupied by the 16-port CSI-RS to be (p,q), where p is CSI reference configuration information corresponding to the first 8 REs in the REs occupied by the 16-port CSI-RS, and p=0, 1, 2, 3, 4, 5; and q is CSI reference configuration information corresponding to the latter REs in the REs occupied by the 16-port CSI-RS, and q=0, 1, 2, 3, 4, 5.

Optionally, the CSI reference configuration information corresponding to the 8 newly added REs is 5; and the information of the REs occupied by the 16-port CSI-RS is as follows: p=0 and q=1; or p=1 and q=0; or p=0 and q=3; or p=3 and q=0; or p=2 and q=4; or p=4 and q=2; or p=1 and q=4; or p=4 and q=1; or p=3 and q=5; or p=5 and q=3; or p=2 and q=5; or p=5 and q=2.

During specific implementation, the device for configuring a CSI-RS provided by the embodiment of the disclosure may further include:

a receiving unit, configured to receive CSI feedback information sent by the UE, where the CSI feedback information is determined based on a measurement result of CSI-RS measurement performed by the UE according to the configuration information of the CSI-RS.

For convenient description, each of the abovementioned part is functionally divided into each module (or unit) for respective description. Of course, when the disclosure is implemented, a function of each module (or unit) may be realized in the same or multiple pieces of software or hardware.

During specific implementation, the device for configuring a CSI-RS may be arranged in the base station, and then the base station implements CSI-RS configuration.

Figure 15:
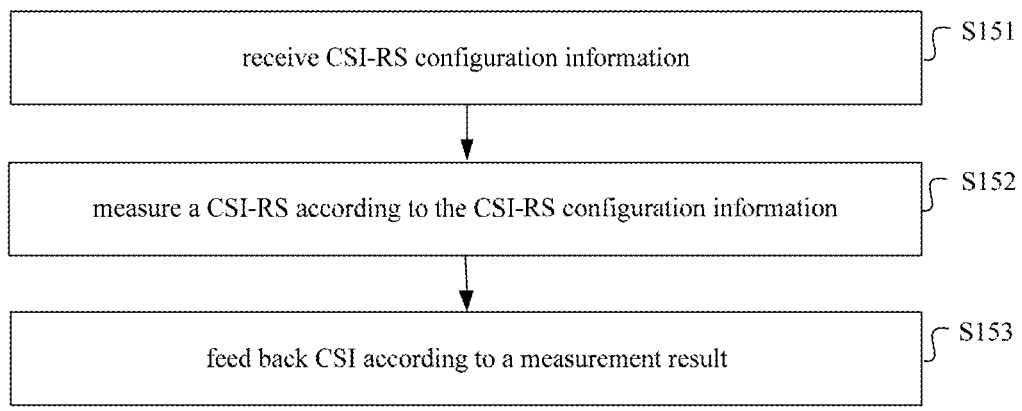
FIG. 15 is an implementation flowchart of implementing a method for feeding back CSI by UE according to an embodiment of the disclosure.

FIG. 15 is an implementation flowchart of implementing a method for feeding back CSI by UE, which may include the following steps.

In S151, configuration information of a CSI-RS is received, where the configuration information of the CSI-RS includes information of REs occupied by a 16-port CSI-RS, and the REs occupied by the 16-port CSI-RS include REs other than REs occupied by a PDCCH, a cell-specific RS and a UE-specific RS.

In S152, the CSI-RS is measured according to the configuration information of the CSI-RS.

In S153, CSI feedback is performed according to a measurement result.

Specifically, CSI fed back to the base station by the UE according to the measurement result is formed by an RI, a PMI and a CQI.

Figure 16:
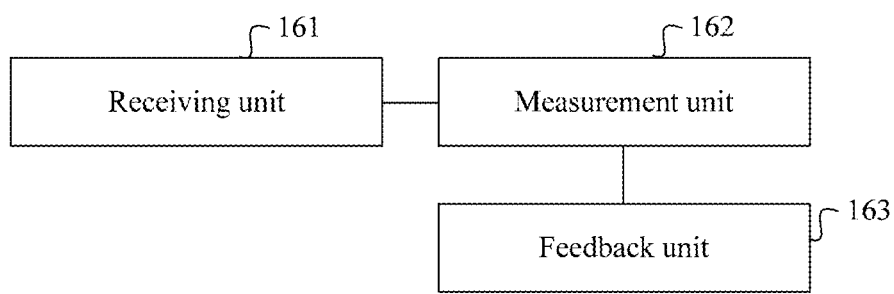
FIG. 16 is a structure diagram of a device for feeding back CSI according to an embodiment of the disclosure.

FIG. 16 is a structure diagram of a device for feeding back CSI according to an embodiment of the disclosure, which may include:

a receiving unit 161, configured to receive configuration information of a CSI-RS, where the configuration information of the CSI-RS includes information of REs occupied by a 16-port CSI-RS, and the REs occupied by the 16-port CSI-RS includes REs other than REs occupied by a PDCCH, a cell-specific RS and a UE-specific RS;

a measurement unit 162, configured to measure the CSI-RS according to the configuration information of the CSI-RS; and a feedback unit 163, configured to feed back CSI according to a measurement result from the measurement unit 162.

For convenient description, each of the abovementioned part is functionally divided into each module (or unit) for respective description. Of course, when the disclosure is implemented, a function of each module (or unit) may be realized in the same or multiple pieces of software or hardware. During specific implementation, the device for feeding back CSI may be arranged in UE.

Those skilled in the art should know that the embodiment of the disclosure may be provided as a method, a system or a computer program product. Therefore, the disclosure may adopt a form of pure hardware embodiment, pure software embodiment and combined software and hardware embodiment. Moreover, the disclosure may adopt a form of computer program product implemented on one or more computer-available storage media (including, but not limited to, a disk memory, a Compact Disc Read-Only Memory (CD-ROM) and an optical memory) including computer-available program codes.

The disclosure is described with reference to flowcharts and/or block diagrams of the method, equipment (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function specified in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function specified in one flow or many flows in the flowcharts and/or one block or many blocks in the block diagrams are provided by the instructions executed on the computer or the other programmable data processing equipment.

Although the preferred embodiments of the disclosure have been described, those skilled in the art may make additional alterations and modifications to these embodiments once knowing the basic creative concept. Therefore, the appended claims are intended to be explained to include all the alterations and modifications of the preferred embodiments falling within the scope of the disclosure.

Obviously, those skilled in the art may make various modifications and transformations to the disclosure without departing from the spirit and scope of the disclosure. Therefore, if these modifications and transformations of the disclosure fall within the scope of the claims of the disclosure and equivalent technologies thereof, the disclosure is also intended to include these modifications and transformations.

The invention claimed is:

1. A method for configuring a Channel State Information-Reference Signal (CSI-RS), the method comprising:
   determining configuration information of 16-port CSI-RS configured for an User Equipment (UE), wherein the configuration information of the CSI-RS comprises information of Resource Elements (REs) occupied by the 16-port CSI-RS configured for the UE, and the REs occupied by the 16-port CSI-RS comprises REs other than REs occupied by a Physical Downlink Control Channel (PDCCH), a cell-specific Reference Signal (RS) and a UE-specific RS; and
   sending, to the UE, the configuration information of the 16-port CSI-RS configured for the UE;
   wherein the REs occupied by the CSI-RS are predetermined REs occupied by a CSI-RS; and the REs occupied by the 16-port CSI-RS configured for the UE are a combination of REs occupied by any two 8-port CSI-RSs;
   wherein determining the information of the REs occupied by the 16-port CSI-RS configured for the UE comprises:
   determining the information of the REs occupied by the 16-port CSI-RS to be (p,q), wherein P is Channel State Information (CSI) reference configuration information corresponding to the REs occupied by a first 8-port CSI-RS in the REs occupied by the 16-port CSI-RS, and p=0,1,2,3,4 and q is CSI reference configuration information corresponding to the REs occupied by a second 8-port CSI-RS in the REs occupied by the 16-port CSI-RS, and q=0,1,2,3,4.

2. A device for configuring a Channel State Information-Reference Signal (CSI-RS), the device comprising a processor and one or more units stored on a memory and executable by the processor, the one or more units comprises:
   a determination unit, configured to determine configuration information of a 16-port CSI-RS configured for an User Equipment (UE), wherein the configuration information of the CSI-RS comprises information of Resource Elements (REs) occupied by the 16-port CSI-RS configured for the UE, and the REs occupied by the 16-port CSI-RS comprises REs other than REs occupied by a Physical Downlink Control Channel (PDCCH), a cell-specific Reference Signal (RS) and a UE-specific RS; and
   a sending unit, configured to send, to the UE, the configuration information of the 16-port CSI-RS configured for the UE;
   wherein the REs occupied by the CSI-RS are predetermined REs occupied by a CSI-RS; and the REs occupied by the 16-port CSI-RS configured for the UE are a combination of REs occupied by any two 8-port CSI-RSs;
   wherein the determination unit is configured to determine the information of the REs occupied by the 16-port CSI-RS to be (p,q) wherein P is Channel State Information (CSI) reference configuration information corresponding to the REs occupied by a first 8-port CSI-RS in the REs occupied by the 16-port CSI-RS, and p=0,1,2,3,4 and q is CSI reference configuration information corresponding to the REs occupied by a second 8-port CSI-RS in the REs occupied by the 16-port CSI-RS, and q=0,1,2,3,4.

3. A base station, comprising a device for configuring a Channel State Information-Reference Signal (CSI-RS), the device comprising a processor and one or more units stored on a memory and executable by the processor, the one or more units comprises:
   a determination unit, configured to determine configuration information of a 16-port CSI-RS configured for an User Equipment (UE), wherein the configuration information of the CSI-RS comprises information of Resource Elements (REs) occupied by the 16-port CSI-RS configured for the UE, and the REs occupied by the 16-port CSI-RS comprises REs other than REs occupied by a Physical Downlink Control Channel (PDCCH), a cell-specific Reference Signal (RS) and a UE-specific RS; and
   a sending unit, configured to send, to the UE, the configuration information of the 16-port CSI-RS configured for the UE;
   wherein the REs occupied by the CSI-RS are predetermined REs occupied by a CSI-RS; and the REs occupied by the 16-port CSI-RS configured for the UE are a combination of REs occupied by any two 8-port CSI-RSs;
   wherein the determination unit is configured to determine the information of the REs occupied by the 16-port CSI-RS to be (p,q), wherein P is Channel State Information (CSI) reference configuration information corresponding to the REs occupied by a first 8-port CSI-RS in the REs occupied by the 16-port CSI-RS, and p=0,1,2,3,4 and q is CSI reference configuration information corresponding to the REs occupied by a second 8-port CSI-RS in the REs occupied by the 16-port CSI-RS, and q=0,1,2,3,4.

* * * * *